US009234968B1

(12) United States Patent
Cherepy et al.

(10) Patent No.: US 9,234,968 B1
(45) Date of Patent: Jan. 12, 2016

(54) PLASTIC SCINTILLATORS WITH HIGH LOADING OF ONE OR MORE METAL CARBOXYLATES

(71) Applicant: Lawrence Livermore National Security, LLC, Livermore, CA (US)

(72) Inventors: Nerine Cherepy, Piedmont, CA (US); Robert Dean Sanner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/512,210

(22) Filed: Oct. 10, 2014

(51) Int. Cl.
| G01T 1/20 | (2006.01) |
| G01T 1/203 | (2006.01) |
| G01T 1/208 | (2006.01) |
| G01T 3/06 | (2006.01) |

(52) U.S. Cl.
CPC ............... *G01T 1/2033* (2013.01); *G01T 1/208* (2013.01); *G01T 3/06* (2013.01)

(58) Field of Classification Search
CPC ........... G01T 1/203; G01T 1/20; C08L 39/00; C09K 11/06
USPC ........................................................ 250/362
See application file for complete search history.

(56) References Cited

U.S. PATENT DOCUMENTS

| 3,041,287 A | 6/1962 | Hyman |
| 3,609,093 A | 9/1971 | Harrah |
| 5,420,959 A | 5/1995 | Walker et al. |
| 5,606,638 A | 2/1997 | Tymianski et al. |
| 6,544,442 B1 * | 4/2003 | Bell et al. ........................ 252/478 |
| 6,855,270 B2 | 2/2005 | Mumper et al. |
| 7,067,079 B2 | 6/2006 | Bross et al. |
| 7,547,887 B2 | 6/2009 | Ramsden et al. |
| 7,608,829 B2 | 10/2009 | Loureiro et al. |
| 8,698,086 B2 | 4/2014 | Cherepy et al. |
| 8,884,233 B2 | 11/2014 | Cherepy et al. |
| 8,963,094 B2 | 2/2015 | Gozani et al. |
| 2004/0004196 A1 | 1/2004 | DeMeo et al. |
| 2004/0252955 A1 | 12/2004 | Kajiwara et al. |
| 2006/0081782 A1 | 4/2006 | Guillebaud et al. |
| 2007/0069636 A1 | 3/2007 | Choulis et al. |
| 2009/0302195 A1 | 12/2009 | Muenchausen et al. |
| 2011/0192981 A1 | 8/2011 | Menge et al. |

(Continued)

OTHER PUBLICATIONS

Cherepy et al., U.S. Appl. No. 13/162,503, filed Jun. 16, 2011.

(Continued)

*Primary Examiner* — Marcus Taningco
(74) *Attorney, Agent, or Firm* — Zilka Kotab LLP

(57) ABSTRACT

In one embodiment, a material includes at least one metal compound incorporated into a polymeric matrix, where the metal compound includes a metal and one or more carboxylate ligands, where at least one of the one or more carboxylate ligands includes a tertiary butyl group, and where the material is optically transparent. In another embodiment, a method includes: processing pulse traces corresponding to light pulses from a scintillator material; and outputting a result of the processing, where the scintillator material comprises at least one metal compound incorporated into a polymeric matrix, the at least one metal compound including a metal and one or more carboxylate ligands, where at least one of the one or more carboxylate ligands has a tertiary butyl group, and where the scintillator material is optically transparent and has an energy resolution at 662 keV of less than about 20%.

20 Claims, 18 Drawing Sheets

(56) References Cited

U.S. PATENT DOCUMENTS

| | | |
|---|---|---|
| 2011/0303852 A1 | 12/2011 | Menge |
| 2011/0315885 A1 | 12/2011 | Cherepy et al. |
| 2012/0153164 A1 | 6/2012 | Cherepy et al. |
| 2013/0299702 A1 | 11/2013 | Zaitseva et al. |
| 2014/0027646 A1 | 1/2014 | Zaitseva et al. |
| 2014/0042330 A1 | 2/2014 | Gozani et al. |
| 2014/0197321 A1 | 7/2014 | Bendahan et al. |
| 2015/0028217 A1 | 1/2015 | Zaitseva et al. |

OTHER PUBLICATIONS

Non-Final Office Action from U.S. Appl. No. 13/162,503, dated Jan. 15, 2013.

Final Office Action from U.S. Appl. No. 13/162,503, dated May 7, 2013.

Notice of Allowance from U.S. Appl. No. 13/162,503, dated Nov. 27, 2013.

Zaitseva et al., U.S. Appl. No. 13/437,836, filed Apr. 2, 2012.

Zaitseva et al., U.S. Appl. No. 13/471,259, filed May 14, 2012.

Zaitseva et al., U.S. Appl. No. 14/253,754, filed Apr. 15, 2014.

Cherepy et al, U.S. Appl. No. 12/940,486, filed Nov. 5, 2010.

Gozani et al., U.S. Appl. No. 13/753,458, filed Jan. 29, 2013.

Bendahan et al., U.S. Appl. No. 13/740,075, filed Jan. 11, 2013.

International Preliminary Examination Report from PCT Application No. PCT/US2011/040846, dated Jan. 10, 2013.

International Search Report and Written Opinion from PCT Application No. PCT/US2011/040846, dated May 31, 2012.

Baroni et al., "Addition of Hetero-Organic Compounds to Polystyrene," Translated from Atomnaya Energiya, vol. 17, No. 6, 1964, pp. 1261-1264.

Bertrand et al., "Influence of bismuth loading in polystyrene-based plastic scintillators for low energy gamma spectroscopy," Journal of Materials Chemistry C, Jun. 26, 2014, pp. 7304-7312.

Breukers et al., "Transparent lithium loaded plastic scintillators for thermal neutron detection," Nuclear Instruments and Methods in Physics Research A, vol. 701, 2013, pp. 58-61.

Britvich et al., "New Heavy Plastic Scintillators," Instruments and Experimental Techniques, vol. 43, No. 1, 2000, pp. 36-39.

Campbell et al., "Efficient plastic scintillators utilizing phosphorescent dopants," Applied Physics Letters, vol. 90, Jan. 5, 2007, pp. 012117/1-012117/3.

CAS, "Molecule of the Week—Triphenyl bismuth," Chemical Abstracts Service, http://www.cas.org/motw/triphenylbismuth.html, Mar. 26, 2007.

Chatterjee et al., "X-ray contrast polymers of p-styryldi(p-toly)bismuth: synthesis and properties," Polymer, vol. 36, No. 11, 1995, pp. 2289-2296.

Cherepy et al., "Bismuth-Loaded Plastic Scintillators for Gamma Spectroscopy and Neutron Active Interrogation," Nuclear Science Symposium and Medical Imaging Conference IEEE, 2012, pp. 1972-1973.

Glodo et al., "Development of the Cs2LiYCI6 Scintillator," Journal of Crystal Growth, vol. 379, 2013, pp. 73-78.

Hamel et al., "Gammastic: towards a Pseudo-gamma Spectrometry in Plastic Scintillators," Advancements in Nuclear Instrumentation Measurement Methods and their Applications, 2013, pp. 1-5.

Rupert et al., "Bismuth-loaded plastic scintillators for gamma-ray spectroscopy," Europhysics Lett., vol. 97, Jan. 2012, pp. 22002/1-22002/4.

Zaitseva, et al, "Pulse shape discrimination with lithium-containing organic scintillators," Nuclear Instruments and Methods A, vol. 729, 2013, pp. 747-754.

Thompson, M., "The Evolution of Organometallic Complexes in Organic Light-Emitting Devices," MRS Bulletin, vol. 32, Sep. 2007, pp. 694-701.

Troyanov et al., "Crystal and molecular structure of bismuth(III) 2,2—dimethylpropanoate," Journal of the Chemical Society Chemical Communications, 1993, pp. 335-336.

\* cited by examiner

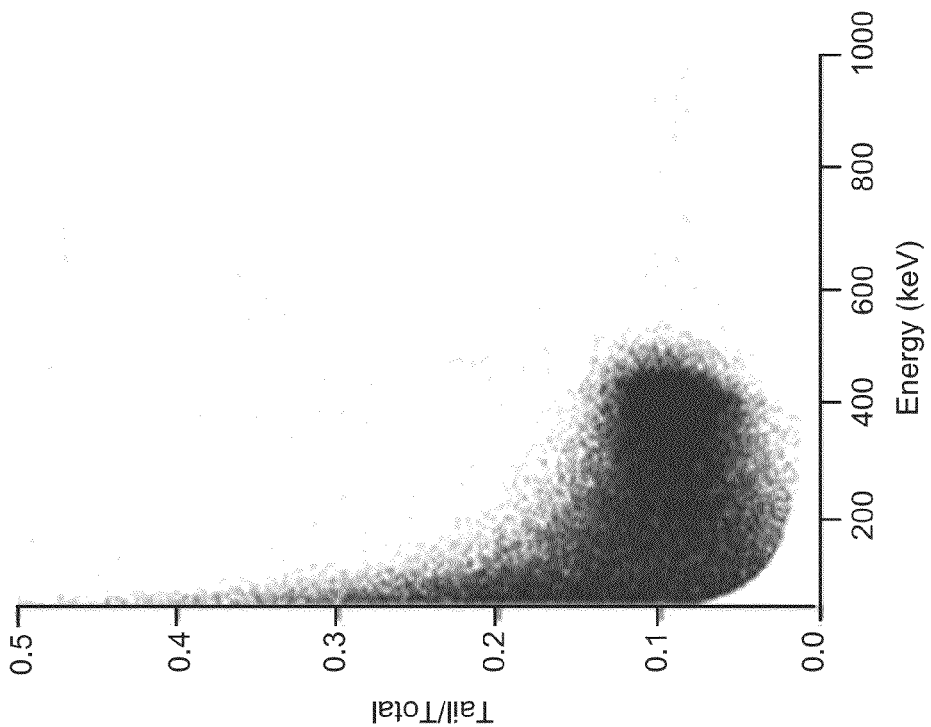
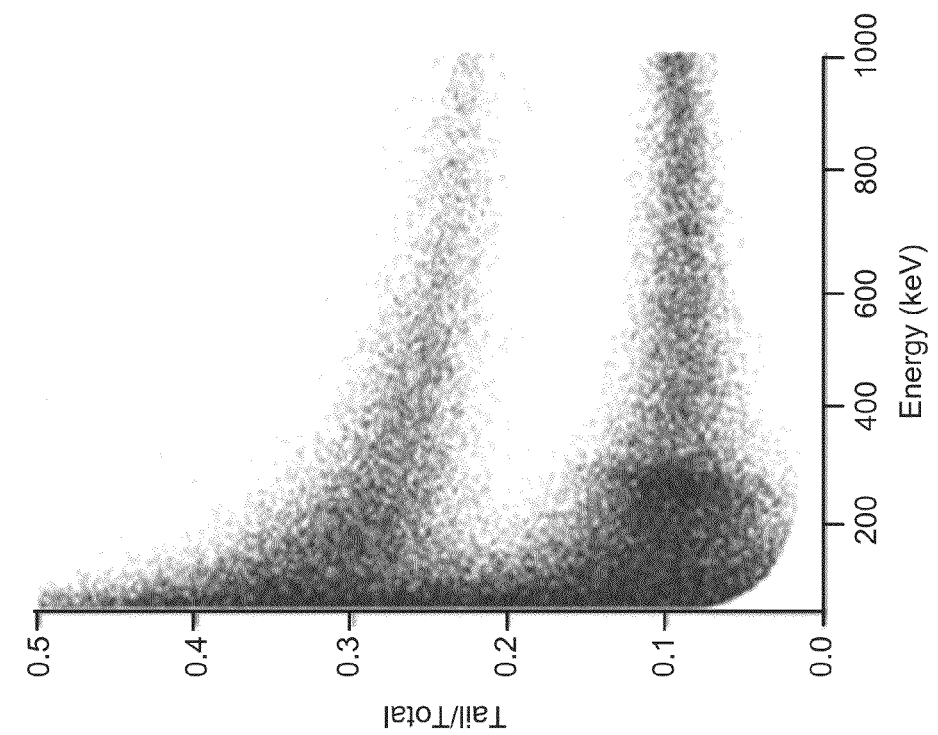
FIG. 23A
FIG. 23B

PLASTIC SCINTILLATORS WITH HIGH LOADING OF ONE OR MORE METAL CARBOXYLATES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to polymeric materials, and more particularly to polymeric materials having a high loading of one or more metal carboxylates, where the polymeric materials may be especially useful for thermal neutron, fast neutron and/or gamma detection.

BACKGROUND

Radioactive materials are often detected and identified by measuring gamma-rays and/or neutrons emitted from the materials. The energy of gamma-rays is specific to that particular material and acts as a "finger print" to identify the material. Similarly, neutron emissions may be used to identify the material. Of high value are detectors capable of identifying the distinctive time-correlated signatures corresponding to neutrons and gamma rays, or "gammas" emitted by fissioning material from within a background of uncorrelated natural radiation. A detector capable of distinguishing neutrons from gammas, as well as offering a fast response time typically has better capability for detecting the distinctive time-correlated events indicative of the presence of fissioning nuclei.

The ability to detect gamma rays and/or neutrons is a vital tool for many areas of research. For example, gamma-ray/neutron detectors allow scientists to study celestial phenomena and diagnose medical diseases. Neutron imaging is used in non-destructive evaluation of complex objects. Additionally, gamma and neutron detectors are important tools for homeland security, helping the nation confront new security challenges. The nuclear non-proliferation mission requires detectors capable of identifying diversion or smuggling of nuclear materials. Government agencies need detectors for scenarios in which a terrorist might use radioactive materials to fashion a destructive device targeted against civilians, structures, or national events. To better detect and prevent nuclear incidents, the Department of Energy (DOE) and the Department of Homeland Security (DHS) are funding projects to develop a suite of detection systems that can search for radioactive sources in different environments.

One particularly useful type of radiation detection, pulse shape discrimination (PSD) provides means for high-energy neutron detection in the presence of gamma radiation background by utilizing the difference in the shapes of scintillation pulses excited by neutrons (recoil protons) and gamma (γ)-rays in organic scintillators. PSD phenomena in organic scintillators are based on the existence of multiple components in the fluorescent decay. In addition to the principal prompt component decaying exponentially (prompt fluorescence), slower emission components with longer decay times (delayed emission) exhibit increased amplitudes for neutron scintillation events, compared to gamma scintillation events. According to a commonly accepted mechanism shown in FIG. 1, the fast component results from the direct radiative de-excitation of excited singlet states ($S_1$), while the slow component originates from the collisional interaction of pairs of molecules (or excitons) in the lowest excited it-triplet states ($T_1$).

Since the triplet is known to be mobile in some compounds, the energy migrates until the collision of two triplets collide and experience a process, shown as Equation 1:

$$T_1 + T_1 \rightarrow S_0 + S_1 \qquad \text{Equation 1}$$

In Equation 1, $T_1$ is a triplet, $S_0$ is the ground state, and $S_1$ is a first excited state. Finally, the delayed singlet emission occurs with a decay rate characteristic of the migration rate and concentration of the triplet population, and is represented by Equation 2:

$$S_1 \rightarrow S_0 + h\nu \qquad \text{Equation 2}$$

In Equation 2, hv is fluorescence, while $S_0$ is the ground state and $S_1$ is a first excited state. The lifetime of the delayed emission is determined by the lifetime of $T_1$ and the rate of $T_1 T_1$ collisions. The short range of the energetic protons produced from neutron collisions yields a high concentration of triplets, compared to the longer range of the electrons from the gamma interactions, leading to the enhanced level of delayed emission with longer decay times in neutron-induced pulses in comparison to those produced by the gamma excitation. The observation of PSD in organics with phenyl groups is believed to be, in part, related to the aromatic ring structure, allowing for the migration of triplet energy.

FIG. 2A shows a plot of average waveforms for a stilbene test crystal indicating different levels of delayed light in neutron and gamma scintillation pulses. As can be seen from the plot, some light is produced by the crystal almost immediately, referred to as prompt light, and other light is produced by the crystal over a period of time, referred to as delayed light. Generally, the plot for each type of radiation will have a steep component 202 and a tail component 204. The upper line in the plot represents neutron light decay, while the lower line represents gamma (γ) light decay. As shown in FIG. 2A, the shape for the neutron response has a large tail component 204, which is much smaller or almost negligible for gammas. Thus, stilbene is able to differentiate between the neutron and gamma light decays, and produces noticeably different lines for each radiation type. Unfortunately, growth of stilbene single crystals is difficult and costly, and the crystals are fragile and extremely sensitive to thermal and mechanical shock, making them difficult to field and creating demand for plastic-based alternatives.

Modern waveform digitizers allow for easy separation of neutron and gamma pulses, enabling instrumentation of PSD scintillators into fieldable detectors, as shown in FIG. 2B. The waveforms may be numerically integrated over two time intervals: $\Delta_{Total}$ and a subinterval $\Delta_{Tail}$ (e.g., for >50 ns), corresponding to the total charge and the delayed component of the signal, respectively. The value of the ratio of charge $R = Q_{Tail}/Q_{Total}$ for the two time intervals indicates whether the considered event was likely produced by a neutron (high R value) or a gamma ray (small R value). The plot shown in FIG. 2B reveals the presence of both neutrons (upper scatter points) and gammas (lower scatter points) in a plot of the ratio of charge ($Q_{Tail}/Q_{Total}$) versus the pulse height.

FIG. 2C illustrates one approach where the neutron/gamma delayed light separation, S, in the stilbene test crystal is used for calculation of the PSD figure of merit (FOM). The PSD separation, S, refers to the gap between the mean ratio of charge ($Q_{Tail}/Q_{Total}$) for gamma rays and the mean ratio of charge ($Q_{Tail}/Q_{Total}$) for neutrons taken over an extended period of time. The larger the separation, S, the better the organic crystal is at PSD for distinguishing gammas and neutrons.

The PSD technique is most frequently utilized for discrimination between fast neutrons (recoil protons) and gamma-rays (Compton electrons) using liquid scintillators and a few organic crystals. Recent developments broadened the group of PSD materials to include scintillating plastics.

Plastic scintillators are radiation detectors with multiple fields of use that may be easily and inexpensively manufactured in different configurations and sizes. However, being comprised of materials with a low effective atomic number ($Z_{eff}$), hydrocarbon-based plastics exhibit inefficient photoelectric absorption and are thus rarely used to detect gamma radiation. The photoelectric cross section scales as $Z_{eff}^4$. Accordingly, in one approach, a high Z component may be added to a plastic scintillator to increase photoelectric absorption and sensitivity to gamma radiation. One disadvantage with this approach is the reduction in light yield with increasing concentration of the high Z component. This reduction in light yield associated with high Z loaded plastic scintillators is thought to arise from the conversion of singlet excitons to triplet excitons via spin-orbit coupling to the high Z component. The resulting triplet excitons may not be collected by an emitting dye, or fluor present in the plastic scintillator, which is typically a singlet emitter, thereby diminishing the luminescence light yield of the plastic scintillator. It has also been found in some approaches that adding an effective amount of a high Z component in a plastic scintillator to enhance photoelectric absorption has resulted in a yellowing or browning of the plastic scintillator, thus yielding insufficient optical clarity in the scintillating wavelength region.

Moreover, as plastic scintillators are typically comprised of mostly hydrocarbons, such plastic scintillators are unable to detect the large fraction of low-energy (thermal neutrons) that do not generate enough light in elastic scatter interactions. In addition to neutron detectors, neutron imagers based on lens-coupled scintillator screens typically use standard plastic scintillators. For these and other neutron detection systems employed to register neutrons throughout the energy range from multiple MeV down to thermal, employ only proton recoils, which produce relatively low light yields, rendering this approach of minimal value once the neutrons have insufficient energy to produce a detectable signal. For these applications, introduction of a neutron capture agent, such as Lithium, provides a strong signal for thermal neutron detection.

Present techniques for detection of thermal neutrons are typically based on $^3$He detectors. However, due to the imminent shortage of $^3$He, other neutron detection technologies utilizing $^{10}$B- and $^6$Li-loaded scintillating materials have been considered as possible replacements for $^3$He detectors. The neutron detection properties of $^{10}$B- and $^6$Li-containing scintillators are based on known capture reactions:

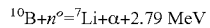
$^{10}$B+$n^o$=$^7$Li+α+2.79 MeV

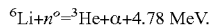
$^6$Li+$n^o$=$^3$He+α+4.78 MeV.

Current scintillators utilizing the thermal neutron detection capabilities of $^{10}$B generally use boron in a gaseous form, as BF$_3$, or in a solid form consisting of pure boron or a compound mixture (e.g. boron carbide) present in a matrix. Moreover, current scintillators utilizing the thermal neutron detection capabilities of $^6$Li include inorganic single crystals (e.g. LiI, LiF, Li-aluminate, Cs$_2$LiYCl$_6$:Ce (CLYC), $^6$Li-lanthanide borate, etc.), $^6$Li-loaded glass scintillators, and composite materials including dispersions of nano- or micro-particles of different Li-containing compounds (e.g. nano- or microscale Li-containing crystals) in liquid or plastic matrices.

However, there are several disadvantages associated with existing $^{10}$B and $^6$Li based detectors. For example, single crystal detectors are limited by the size of the crystals that can be grown and the high cost of doing so. Additionally, difficulties that may arise from use of $^6$Li-loaded and/or $^{10}$B-loaded glass scintillators include long decay times and high sensitivity to gamma rays due to the presence of relatively high-Z constituents in their compositions.

Drawbacks with composite materials comprising dispersions of nano- or micro-particles of scintillating compounds in polymer and/or liquid matrices includes elevated levels of light scatter due to inhomogeneous composition and structure, as well as limitations in effective neutron detecting due to insufficient optical clarity in the scintillating wavelength region. Moreover, the lack of solubility of highly polar Li-containing compounds in on-polar aromatic matrices needed for efficient scintillation is another obstacle preventing the use of $^6$Li-loaded plastic scintillators. While $^{10}$B-containing compounds, such as ortho- and meta-carboranes, may be easily introduced into the composition of plastic scintillators, the fabrication of such detectors may be cost prohibitive due to the high expense associated with isotopical enrichment of carboranes from ~19% of $^{10}$B in natural abundance to over 90% needed for the neutron capture probability.

An additional detector design allowing both gamma spectroscopy and neutron detection employs a Bismuth loaded plastic with a surface coating of a $^6$Li-loaded phosphor. It should be noted that the large volume of the plastic scintillator with high concentration of protons is an effective neutron thermalization medium. This type of detector, known as a "phoswitch," employs PSD to distinguish between events exhibiting the decay time of the plastic scintillator (from gamma interactions), typically ~1 ns, and neutron capture events in the $^6$Li-loaded phosphor, which exhibit the characteristic decay time of the phosphor, typically in the 100-1000 ns range. In this way, a single, low-cost, large-volume plastic scintillator detector, utilizing a single Photomultiplier Tube (PMT) for readout, can provide both gamma spectroscopy and neutron detection.

SUMMARY

According to one embodiment, a material includes at least one metal compound incorporated into a polymeric matrix, where the metal compound includes a metal and one or more carboxylate ligands, where at least one of the one or more carboxylate ligands includes a tertiary butyl group, and where the material is optically transparent.

According to another embodiment, a method includes: processing pulse traces corresponding to light pulses from a scintillator material; and outputting a result of the processing, where the scintillator material comprises at least one metal compound incorporated into a polymeric matrix, the at least one metal compound including a metal and one or more carboxylate ligands, where at least one of the one or more carboxylate ligands has a tertiary butyl group, and where the scintillator material is optically transparent and has an energy resolution at 662 keV of less than about 20%.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 23A shows $^{252}$Cf PSD data for standard PSD plastic scintillators.

FIG. 23B shows $^{137}$Cs PSD data for standard PSD plastic scintillators.

DETAILED DESCRIPTION

Figure 1:
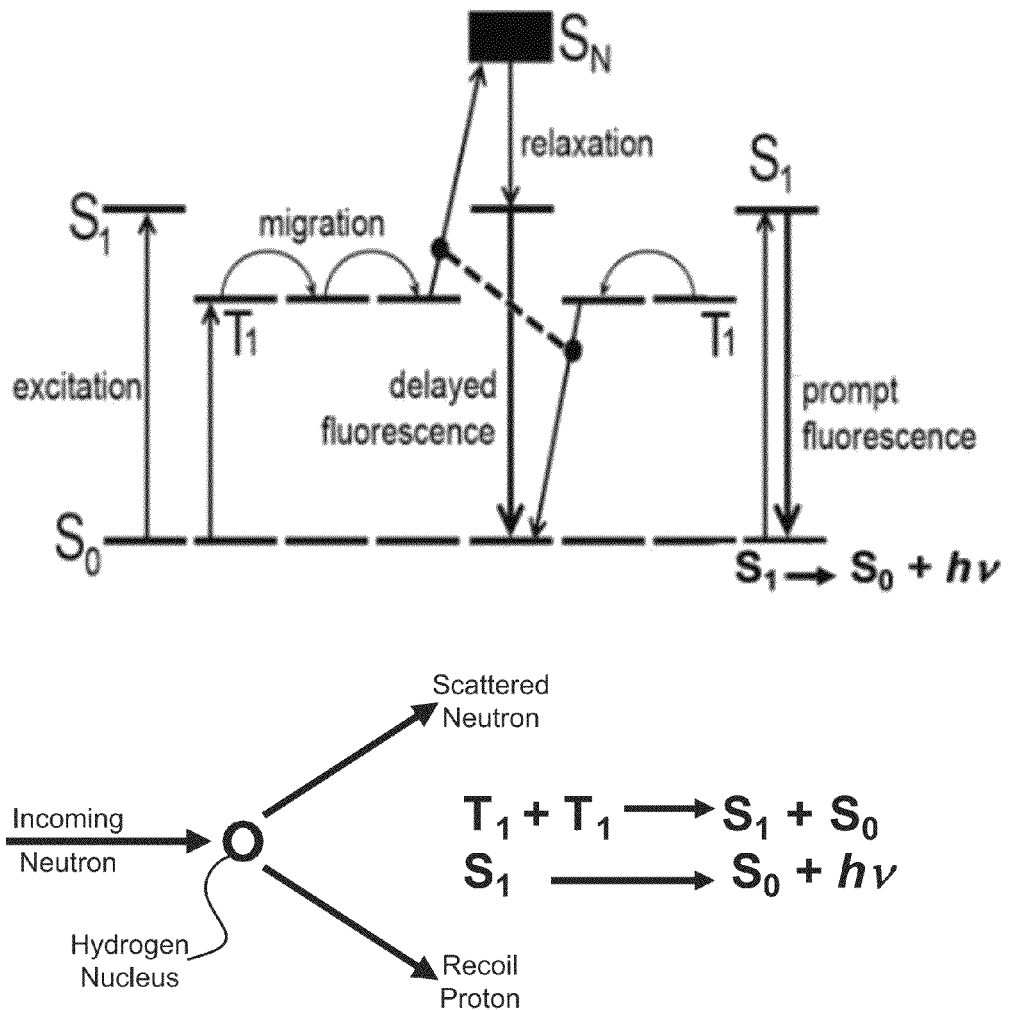
FIG. 1 shows a mechanism for delayed photoluminescence according to the prior art.
Figure 2A:
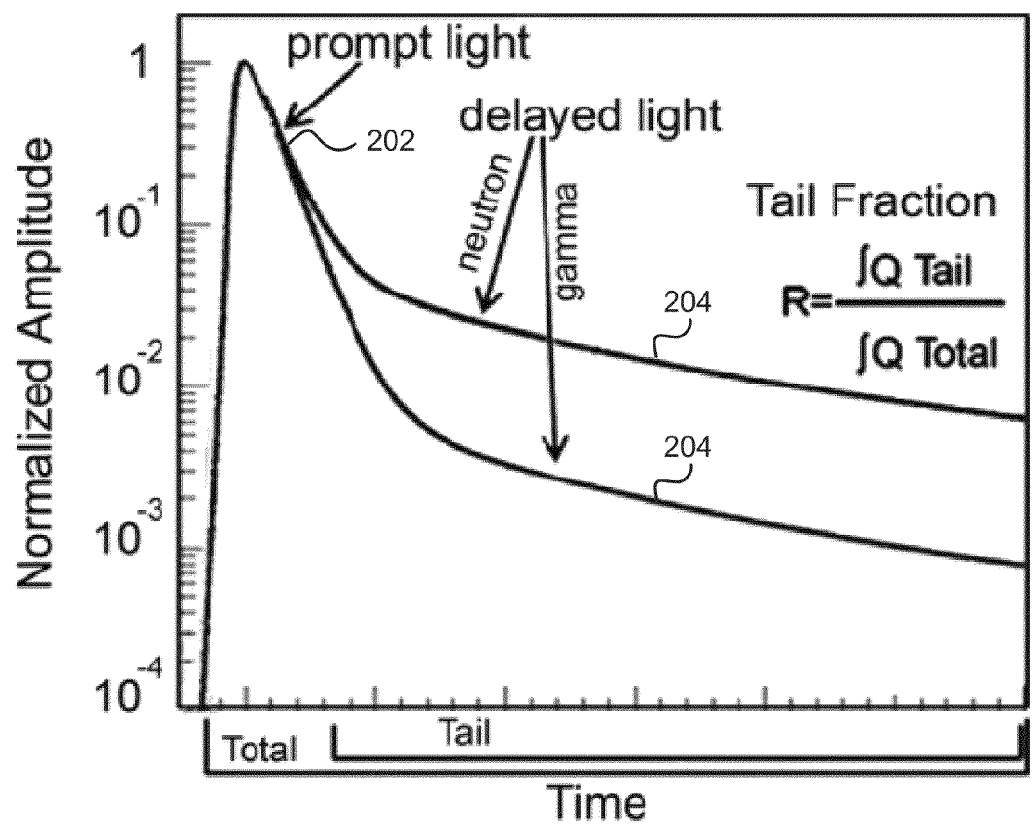
FIG. 2A shows a plot of average waveforms for stilbene indicating different levels of delayed light in neutron and gamma scintillation pulses according to one embodiment from the prior art.
Figure 2B:
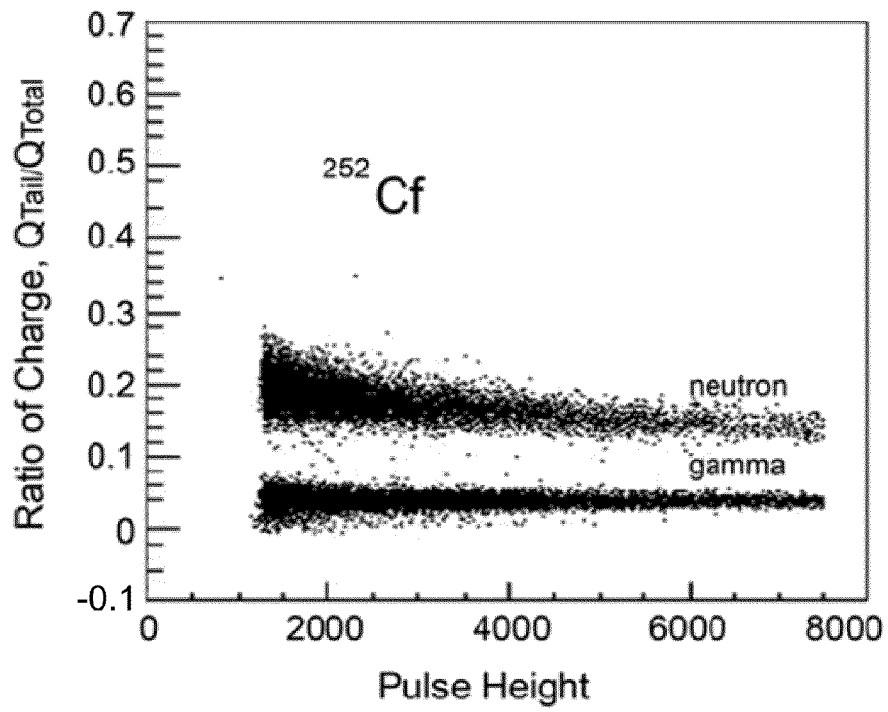
FIG. 2B shows a PSD pattern of a stilbene crystal obtained by digitized separation of neutron and gamma pulses according to one embodiment from the prior art.
Figure 2C:
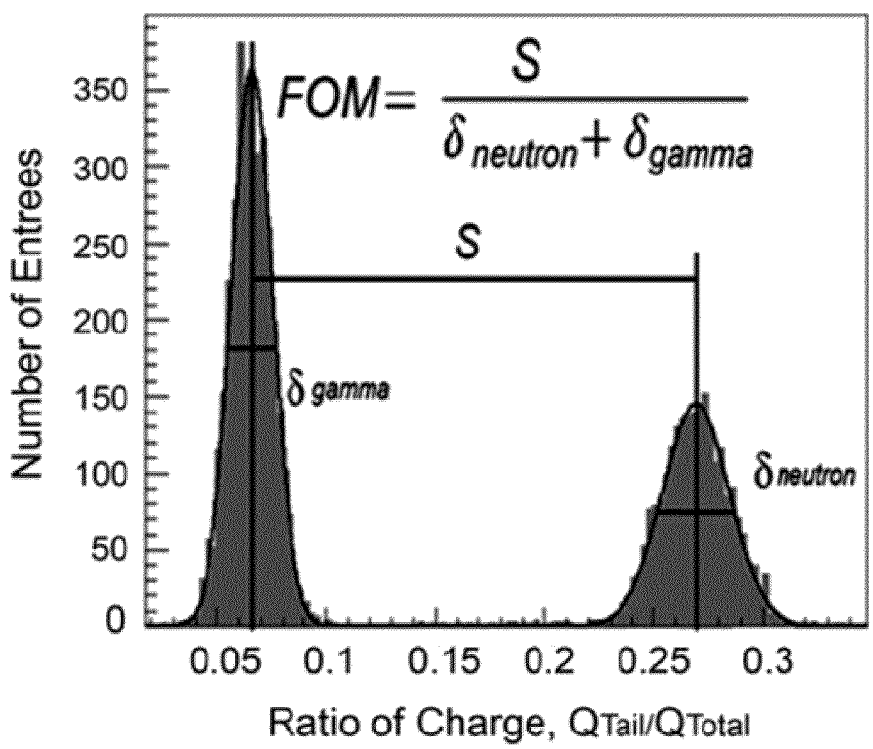
FIG. 2C shows PSD profiles of stilbene used for calculation of the PSD figure of merit (FOM) according to one embodiment from the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 10 nm refers to a length of 10 nm±1 nm, a temperature of about 50° C. refers to a temperature of 50° C.±5° C., etc.

As additionally used herein, a material that is "optically transparent" refers to a material that is substantially free (e.g. >80% free, preferably >90% free) of phase segregation, such that the material is homogenous (e.g. comprises one-phase). Moreover, optically transparent materials are those through which light propagates uniformly and are capable of transmitting at least 90% of incident light.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As discussed previously, robust radiation detectors with a large sensitive area/volume, high detecting efficiency and a low cost means of making/using are important for the detection of gammas and/or neutrons in many areas such as nuclear nonproliferation, international safeguards, national security, scientific research, etc. In particular, fast and robust methods for the identification of special nuclear materials (SNM) are needed for nuclear nonproliferation.

Plastic scintillators are cost effective radiation detectors with wide field applications. For instance, plastic scintillators may be easily and inexpensively manufactured in different configurations and sizes. Further, unlike the handling constraints associated with liquid scintillators, plastic scintillators are easy to handle, thus enabling their use in portal monitoring, environmental radiation protection, and in field conditions with sharply changing temperatures, etc. Additional advantages may be introduced in more approaches by the use of Pulse Shape Discrimination (PSD) formulations that enable separation of neutron signatures from gamma-radiation background.

However, being comprised of materials with a low effective atomic number ($Z_{eff}$), hydrocarbon-based plastics exhibit inefficient photoelectric absorption and are thus rarely used to detect gamma radiation. As such, a high Z component, e.g., a heavy metal, a heavy metal compound, etc., may be added to a plastic scintillator to increase photoelectric absorption and sensitivity to gamma radiation in one approach. One disadvantage with this approach is that among the high-Z elements that could be synthesized as metal complexes/compounds, most of them are either toxic (Hg, Tl, Pb) or very costly (Re, Os, Ir, Pt, Au).

Moreover, another disadvantage associated with the incorporation of a high Z component in plastic scintillators is the reduction in light yield with increasing concentration of the high Z component. This reduction in light yield associated with high Z loaded plastic scintillators is thought to arise from the conversion of singlet excitons to triplet excitons via spin-orbit coupling to the high Z component. In addition, it also has been found with previous attempts to load plastics with other metal compounds that adding an effective amount of a high Z component(s) in a plastic scintillator to enhance photoelectric absorption has resulted in a yellowing or browning of the plastic scintillator, thus yielding insufficient optical clarity in the scintillating wavelength region.

Moreover, as plastic scintillators are typically comprised of mostly hydrocarbons, such plastic scintillators are unable to detect the large fraction of low-energy and thermal neutrons that do not generate enough light in elastic scatter interactions. As such, one approach to detect thermal neutrons may involve loading plastic scintillators with $^{10}$B and $^{6}$Li.

$^{10}$B-containing compounds, such as ortho- and meta-carboranes, may be easily introduced into the composition of plastic scintillators in various approaches. However, the use of such detectors may present difficulties because of the high cost required for isotopical enrichment of carboranes from ~19% of $^{10}$B in natural abundance to over 90% needed for the neutron capture probability.

The principle drawback that prevents the use of $^{6}$Li-loaded plastic scintillators relates to the difficulties in their preparation due to the lack of solubility of highly polar Li-containing compounds in non-polar aromatic matrices needed for efficient scintillation. Thus, the majority of current $^{6}$Li-containing organic scintillators are typically prepared as non-PSD dispersions of nano- or micro-particles of different Li-compounds in liquid or plastic matrices that often have insufficient optical clarity and chemical instability due to inhomogeneous composition and structure.

Embodiments disclosed herein overcome the aforementioned drawbacks by providing optically transparent polymeric materials with a high loading of one or more metal compounds. In preferred embodiments, the optical transparent polymeric materials may be particularly useful as plastic scintillators.

To achieve high solubility of metal compounds in a non-polar organic medium, such as polyvinyl toluene (PVT), polystyrene (PS) or other plastic scintillators disclosed herein, it has been surprisingly and unexpectedly found that fully coordinating a metal ion with at least one carboxylic acid group possessing an aliphatic tail enables very high loadings of metal. Accordingly, in one approach, a metal compound comprising a metal and at least one carboxylate ligand having one tertiary butyl group may be homogeneously dissolved in an plastic matrix, where the resulting plastic scintillator is substantially free (e.g. >80% free, preferably >90% free) of phase segregation (e.g. comprises a single phase, is homogenous, etc.) and is thus optically transparent. In preferred approaches, the carboxylate ligand having one tertiary butyl group may be pivalate. It has been surprisingly and unexpectedly found that such a pivalate ligand may shields the polar nature of bismuth and lithium when coupled/bound thereto, thereby making the resulting Li-pivalate and bismuth-pivalate compounds more soluble in non-polar aromatic plastic matrices. In particular, use of multiple carboxylic acid groups, terminated with branched aliphatic groups, such as the pivalate moiety, based on three butyl groups, results in solubility of metal ions in excess of 30 weight percent for Bismuth (>60 wt. % Bismuth compound) and more than 2 weight percent for Lithium (>30 wt. % Lithium compound).

Following are several examples of general and specific embodiments of the novel polymeric materials comprising a high loading of bismuth, lithium and other metal carboxylates, and/or related systems and methods. The following description also describes several embodiments relating to the use and fabrication of Bi-loaded plastic scintillators particularly useful for gamma spectroscopy. Addition embodiments are directed to Li-loaded plastic scintillators capable of simultaneous detection of thermal neutrons and fast neutrons discriminated from the gamma radiation background.

In one general embodiment, a material includes at least one metal compound incorporated into a polymeric matrix, where the metal compound includes a metal and one or more carboxylate ligands, where at least one of the one or more carboxylate ligands includes a tertiary butyl group, and where the material is optically transparent.

In another general embodiment, a method includes: processing pulse traces corresponding to light pulses from a scintillator material; and outputting a result of the processing, where the scintillator material comprises at least one metal compound incorporated into a polymeric matrix, the at least one metal compound including a metal and one or more carboxylate ligands, where at least one of the one or more carboxylate ligands has a tertiary butyl group, and where the scintillator material is optically transparent and has an energy resolution at 662 keV of less than about 20%.

General Scintillator-Based Radiation Detector System

Figure 3:
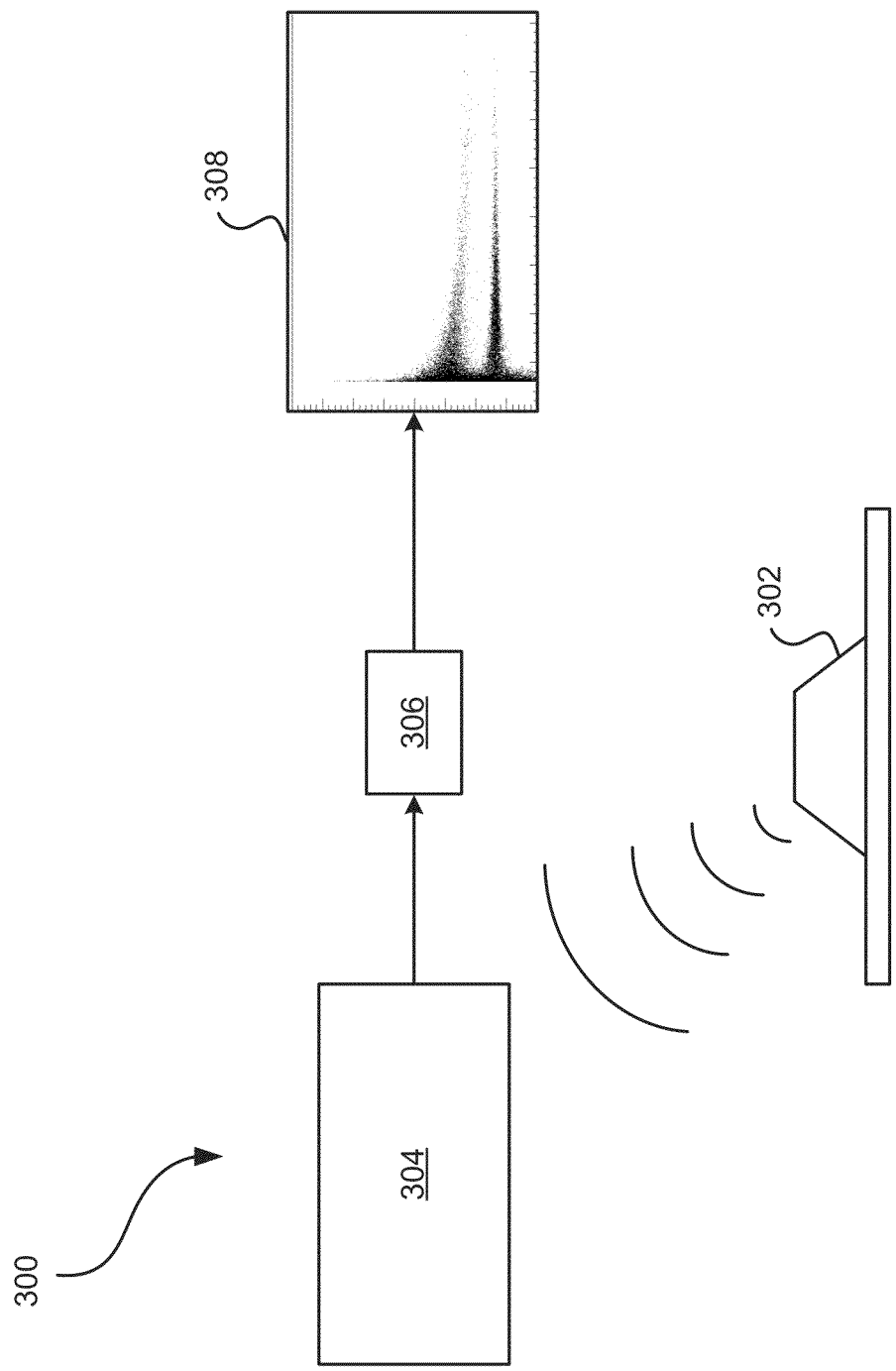
FIG. 3 shows a simplified layout of an instrument according to one embodiment.

FIG. 3 depicts a simplified spectroscopy system according to one embodiment. The system 300 comprises a scintillator material 302, such as of a type described herein, and which is referred to herein interchangeably as a scintillator. The system 300 also includes a photodetector 304, such as a photomultiplier tube or other device known in the art, which can detect light emitted from the scintillator 302, and detect the response of the material to at least one of neutron and gamma ray irradiation.

The scintillator 302 produces light pulses upon occurrence of an event, such as a neutron, a gamma ray, or other radiation engaging the scintillator 302. As the gamma ray, for example, traverses the scintillator 302, photons are released, appearing as light pulses emitted from the scintillator 302. The light pulses are detected by the photodetector 304 and transduced into electrical signals that correspond to the pulses. The type of radiation can then be determined by analyzing the integral of the light pulses and thereby identifying the gamma ray energy absorbed by the scintillator.

In some embodiments, the system 300 may be, further comprise, or be coupleable/coupled to, a preamplifier and/or digitizer (not shown in FIG. 3).

In other embodiments, the system 300 may include a processing device 306 configured to process pulse traces output by the photodetector 304, which correspond to light pulses from the scintillator 302. In some approaches, the processing device 306 may be further configured to generate radiological image data based on the pulse traces output by the photodetector 304.

In additional approaches, system 300 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 308 in any form, such as in a histogram or derivative thereof.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Scintillator Materials

Scintillator materials according to some embodiments may include a polymer matrix and a metal compound homogeneously dispersed therein in some embodiments. In more embodiments, the scintillator materials may also include other additives, such as one or more fluors, homogenously dispersed throughout the polymer matrix.

In various embodiments, a scintillator may include at least one metal compound incorporated into a polymer matrix. A metal compound, as used herein in numerous approaches, may refer to a metal and one or more ligands, preferably a metal coordinated to one or more ligands.

In one particular embodiment, a scintillator may include at least one metal compound incorporated into a polymer matrix, where the metal compound includes a metal and or more carboxylate ligands, and where the scintillator has an energy resolution at 662 keV in a range from about 20% to about 3%. In particular approaches, this metal compound may include a metal ion coordinated to one or more carboxylate ligands. In preferred approaches, at least one of these one or more carboxylate ligands has a tertiary butyl group.

Polymer Matrix Materials

The organic, plastic scintillators described in the embodiments herein may include any suitable polymer matrix as the plastic component. Particularly suitable plastic scintillators are those that include a rigid, durable, optically transparent polymer matrix that possess aromatic or non-aromatic structures.

In one embodiment, the polymer matrix may be capable of supporting one or more metal compounds, particularly metal compounds that include one or more carboxylate ligands. In particular approaches, the polymer matrix may be capable of supporting at least one metal compound that includes one or more carboxylate ligands, where at least one of the carboxylate ligands has a tertiary butyl group, such as those described herein. In some approaches, the polymer matrix may be capable of supporting up to 60 wt. % bismuth pivalate. In other approaches, the polymer matrix may be capable of supporting up to 30 wt. % lithium pivalate. In more approaches, the polymer matrix may be capable of supporting at least two different metal compounds, where the at least two different metal compounds are different with regard to chemical composition, molecular weight, etc.

In another embodiment, the polymer matrix may be capable of supporting a high concentrations of one or more fluors (e.g. primary fluors, secondary fluors, tertiary fluors, etc.) therein. For instance, in some approaches, a suitable plastic matrix may be capable of supporting a total concentration of the fluors in a range from about 3-75 wt. % fluor.

In yet another embodiment, the polymer matrix may comprise one or more of the following: poly-styrene (PS), poly-vinyltoluene (PVT), poly-vinyltriphenylamine, poly(ethylene-2,6-naphthalene dicarboxylate), poly(ethylene terephthalate), polymethylmethacrylate, functionalized polymethacrylate, methacrylic acid, poly-9-vinylcarbazole, etc. and other complex aromatic or non-aromatic polymers capable of solubilizing one or more scintillating fluors and/or one or more metal compounds such as those described herein, as would become apparent to one having ordinary skill in the art upon reading the present disclosure.

In preferred embodiments, the polymer matrix may be at least 50% light transmissive in a wavelength of interest, e.g. a wavelength emitted by one or more fluors present in the organic plastic scintillator system.

In various embodiments, the polymer matrix may comprises a colorless, optically transparent non-PSD plastic material for detection of thermal neutrons via pulse height measurements. In further embodiments, the polymer matrix may comprise a colorless, optically transparent PSD plastic for simultaneous detection of thermal and fast neutrons discriminated from gamma radiation background via PSD measurement techniques.

In more embodiments, the polymer matrix may be provided as a liquid, a non-liquid, a dry powder, etc. as would become apparent to one having ordinary skill in the art upon reading the present descriptions. Moreover, in some approaches the polymer matrix may include aromatic functional groups, such as phenyl groups, among others.

In yet more embodiments, an organic, plastic scintillator material may be fabricated and comprise the polymer matrices as described in U.S. patent application Ser. No. 13/162,503 filed Jun. 16, 2011, U.S. patent application Ser. No. 13/437,836 filed on Apr. 2, 2012, U.S. patent application Ser. No. 13/471,259 filed May 14, 2012, and U.S. patent application Ser. No. 14/253,754 filed on Apr. 15, 2014, which are all incorporated herein by reference in their entirety.

It is important to note that while the aforementioned polymer matrix materials may serve as the plastic component in a plastic scintillator, the polymer matrix materials are not solely limited to scintillation applications.

Metal Compounds

The metal compounds disclosed herein may include any metal compound that is configured to homogeneously dissolve in the plastic matrix materials described above. In various approaches, these metal compounds may include a metal component coordinated to one or more ligands. In some approaches, these metal compounds may be present in an optically transparent polymer matrix in an amount greater than 5 wt. %, preferably greater than 10 wt. %, based on a total weight of the polymer matrix.

In one particular embodiment, at least one of the metal compounds homogeneously dissolved in the aforementioned plastic matrix materials may include one or more carboxylate ligands. In some approaches, the metal compounds including one or more carboxylate ligands (which may also be referred to as metal carboxylate complexes) may be present in an optically transparent polymer matrix in an amount greater than 5 wt. %, preferably greater than 10 wt. % based on a total weight of the polymer matrix.

For a metal compound including one or more carboxylate ligands, at least one of the carboxylate ligands may include a tertiary butyl group in preferred approaches. In further approaches, at least one of the carboxylate ligands may include a tertiary butyl group attached to a straight or branched carbon chain. In various approaches, this tertiary butyl group may be present in an amount greater than about 5 wt. % based on a total weight of the metal compound. It has been surprisingly and unexpectedly found that the presence of the at least one tertiary butyl group in a carboxylate ligand of the metal compound enhances the solubility of the metal compound in the polymer matrices disclosed herein, as well as prevents and/or mitigates the metal compound from undesired reactions with the polymer matrix and/or other materials dispersed therein due to steric hindrance. Moreover, it has also been surprisingly and unexpectedly found that incorporation of a metal compound having at least one carboxylate ligand with a tertiary butyl group into the polymer matrices disclosed herein does not degrade the optical transparency of said polymer matrices.

In one particular approach, at least one of the carboxylate ligands may be pivalate. In some approaches, the pivalate may be present in an amount greater than about 10 wt. % based on a total weight of the metal pivalate compound/complex. In more approaches, the metal pivalate compound/complex may be present in a polymer matrix in an amount greater than 10 wt. % based on a total weight of the polymer matrix.

In some approaches, one or more of the metal compounds disclosed herein may be incorporated into a polymer matrix via copolymerization, crosslinking, etc. Alternatively, one or more of the metal compounds disclosed herein may be simply surrounded by the polymer matrix but not chemically coupled or linked thereto. For example, in one approach, at least one of the metal compounds may be functionalized with a polymerizable group prior to incorporation into a polymer matrix. Incorporation of the at least one metal compound functionalized with a polymerizable group into a polymer matrix may thus result in the at least one metal compound being copolymerized with the polymer matrix. Suitable polymerizable groups may include but is not limited to a vinyl group.

In yet more approaches, the metal component of at least one metal compound homogeneously dissolved in the polymer matrices disclosed herein may include bismuth, lithium, cesium, etc., or other metals as would become apparent to one skilled in the art upon reading the present disclosure. Accordingly, in some approaches, at least one of the metal compounds may include bismuth (III) coupled to one or more carboxylate ligands, where at least one of the carboxylate ligands preferably has a tertiary butyl group. These bismuth containing compounds may be characterized as being soluble in the polymer matrices disclosed herein, as well as thermal stable even when exposed to high temperatures in instances such as polymerization.

Figure 4A:
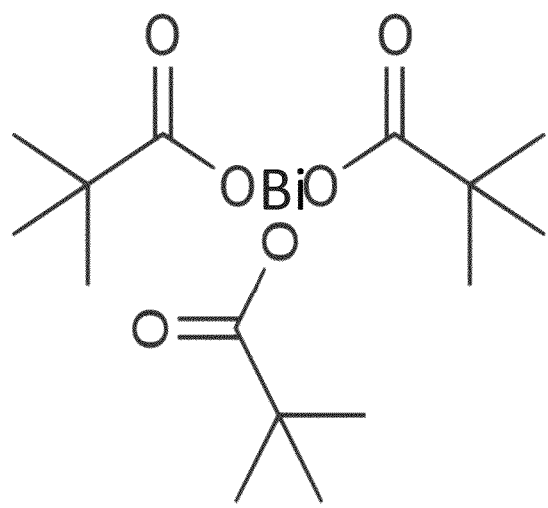
FIG. 4A shows a representation of the chemical structure of bismuth tripivalate, (Bi(P)).

In one exemplary approach, at least one of the metal compounds may be bismuth tripivalate as shown in FIG. 4A. It is important to note that while the bismuth in FIG. 4A is shown coupled to the terminal oxygen atoms of the three pivalate ligands, the bismuth may also be coordinated to the oxygen atom of the carbonyl group in one or more of the pivalate ligands in an asymmetric chelation (S. I. Troyanov and A. P. Pisarevsky, *J. Chem. Soc. Chem. Commun.*, pp. 335-336, 1993). In various approaches, bismuth tripivalate may be present in a polymer matrix in a range from about 5 wt. % to about 60 wt. % based on a total weight of the resulting material.

It is important to note that bismuth pivalate may be synthesized using any known synthesis technique. However, one exemplary method of making bismuth pivalate may include combining triphenyl bismuth and pivalic acid, and refluxing the resulting mixture in carbon tetrachloride for about 12 hours at elevated temperatures, such as about 80° C. The triphenyl bismuth is not thermally stable at such temperatures, and thus decomposes to form bismuth tripivalate.

Incorporation of bismuth compounds into a polymer matrix may be particularly useful for gamma ray spectroscopy applications. Without wishing to be bound to any theory, it is believed that in order to achieve gamma ray spectroscopy, a high loading of a high Z component s required. Furthermore, it is desirable that the high-Z component be mixed homogenously into a polymer trix for optimum scintillator response and harvesting of light. Bismuth-containing materials, and especially bismuth tripivalate, meet these requirements.

Figure 4B:
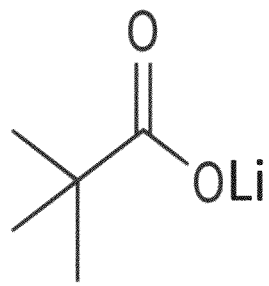
FIG. 4B shows a representation of the chemical structure of lithium pivalate, (Li(P)).

In other approaches, at least one of the metal compounds homogeneously dissolved in a polymer matrix may include lithium coupled to a carboxylate ligand, the carboxylate ligand preferably including a tertiary butyl group. Incorporation of lithium compounds into a polymer matrix may be particularly useful for detection of thermal neutrons. In one exemplary approach, at least one of the metal compounds may be lithium pivalate as shown in FIG. 4B. In various approaches, lithium pivalate may be present in a polymer matrix in a range from about 5 wt. % to about 30 wt. %.

It is important to note that lithium pivalate may be synthesized using any known synthesis technique. However, one exemplary method of making lithium pivalate may include combining lithium hydroxide and pivalic acid at room temperature. Lithium pivalate may form as quickly as a few minutes after combination of the aforementioned precursors.

In further approaches, at least one of the metal compounds homogeneously dissolved in a polymer matrix may include cesium coupled to a carboxylate ligand, the carboxylate ligand preferably including a tertiary butyl group. In various approaches, cesium pivalate may be present in a polymer matrix in a range from about 5 wt. % to about 30 wt. %.

Fluors

In some approaches where the polymer matrices disclosed herein may serve as the plastic component of a plastic scintillator, the polymer matrices may include an effective amount of a fluor resulting in an emission rating of greater than 3,000 photons/MeV. An effective amount of fluor is at least the quantity of fluor that enables emission of a detectable light event from the plastic scintillator. In one approach, the fluor may be present in the plastic scintillator from about 0.005% to about 5% by weight or more. For instance, the fluor may be present in an amount ranging from about 5% to about 30 wt. %. As disclosed herein in various embodiments, the concentration of a fluor is described relative to a weight of the bulk plastic scintillator material.

In various approaches, one or more fluors may be incorporated into the polymer matrix according to any suitable mechanism. For example, in some approaches, the primary fluor may be suspended/dispersed in the polymer matrix. In preferred approaches, there may be a substantially uniform distribution of the primary fluor in the polymer matrix. In more approaches, the primary fluor may be crosslinked to the polymer matrix. In still more approaches, the primary fluor may be copolymerized with the polymer matrix, and/or with another component of the polymer matrix, etc. as would be understood by one having ordinary skill in the art upon reading the present descriptions. Of course, other arrangements of fluor and polymer matrix may be utilized without departing from the scope of the present descriptions.

In yet more approaches where one or more fluors are homogeneously dispersed in a polymer matrix, each fluor may be independently selected from an organic fluor and an organometallic fluor. Suitable examples of fluors are also described in U.S. patent application Ser. No. 13/162,503 filed Jun. 16, 2011, U.S. patent application Ser. No. 13/437,836 filed on Apr. 2, 2012, U.S. patent application Ser. No. 13/471,259 filed May 14, 2012, and U.S. patent application Ser. No. 14/253,754 filed on Apr. 15, 2014, which, as noted above, are all incorporated herein by reference in their entirety.

Initiators and Cross-linkers

In some embodiments, the plastic scintillators disclosed herein may also comprise a polymerization initiator and/or a cross-linker. Suitable polymerization free-radical initiators may include, but are not limited to, organic peroxides, such as benzoyl peroxide, azobisisobutyronitrile (AIBN), etc. or other such initiators as would be understood by one having skill in the art upon reading the present disclosure. Suitable cross-linkers may include, but are not limited to, aromatic cross-linkers such divinyl benzene, divinyl toluene, trivinyl benzene, divinyl naphthalene, etc.; aliphatic cross-linking monomers such as di- and polyacrylates and methacrylates, etc.; and other such cross-linkers as would be understood by one having skill in the art upon reading the present disclosure.

In additional embodiments, the initiator may be present in an amount ranging from about 0.001 wt. % to about 1 wt. %. In further embodiments, the cross-linker may be present in an amount ranging from about 0.05 wt. % to about 5 wt. %.

Coating

In various embodiments where a plastic scintillator includes a polymer matrix incorporating a metal compound configured to exhibit an optical response signature for gammas, at least a portion of the outer surface of the plastic scintillator may include a coating/layer configured to exhibit an optical response signature for thermal neutrons. Such a configuration is shown in FIG. 5 according to one exemplary, non-limiting embodiment.

Figure 5:
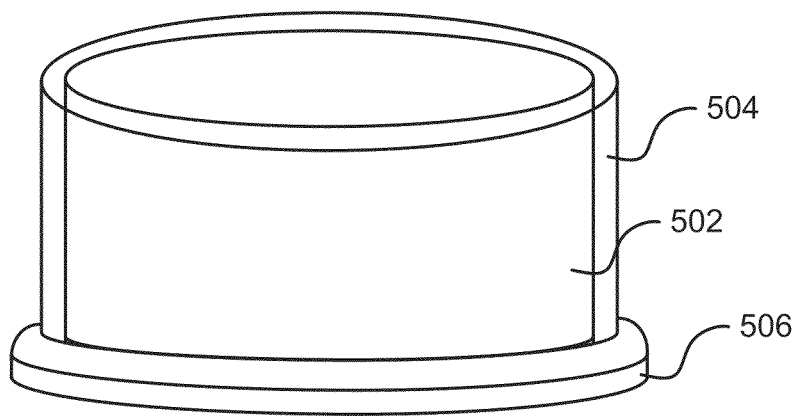
FIG. 5 shows a simplified representation of a plastic scintillator that includes a neutron capture coating applied to all sides thereof expect for the side of the plastic scintillator coupled to a photodetector, according to one embodiment.

As shown in FIG. 5, an optically transparent plastic scintillator 502 may include a polymer matrix and a metal compound homogeneously dispersed therein, the metal compound being configured to exhibit an optical response signature for gammas (e.g., a bismuth and/or cesium containing compound such as those disclosed herein). Suitable polymer matrix materials may include any of those disclosed herein. A coating 504 configured capture thermal neutrons may be present on at least one side of the plastic scintillator 502.

In various approaches, the thickness of the coating may be in a range between 20 and 500 microns.

In some approaches, the coating 504 may include $^6$Li. In preferred approaches, the coating 504 may include ZnS($^6$Li).

The plastic scintillator 502 in combination with the neutron capture coating 504 may be characterized as a phoswitch configuration, with the gamma and neutron dual detection utilizing a photodetector 506, such as a photomultiplier tube or other suitable detection device known in the art.

It is important to note that while the coating 504 shown in FIG. 5 is applied to all sides of the plastic scintillator 502 except the side mounted to the photodetector 506, the coating need not be limited to such a configuration.

Experimental Results and Comparative Examples

Several illustrative experimental results and comparative examples associated with plastic scintillators having a high loading of bismuth or lithium are described below, as well as methods of making the same. It is important to note that these experimental results and comparative examples are in no way limiting, and are provided for illustration purposes only.

Moreover, in the experimental results and comparative examples described below, all percentages by weight are to be understood as disclosed in an amount relative to the bulk weight of the organic plastic scintillator material unless otherwise specified.

Bi-loaded Plastic Scintillators

The following experiments results were conducted using plastic scintillators comprising a PVT polymer matrix with bismuth tripivalate, ("Bi(P)") homogeneously dispersed therein unless otherwise specified. For simplicity, these plastic scintillators will be referred to, in this section, as Bi(P)-loaded PVT scintillators.

Figure 6:
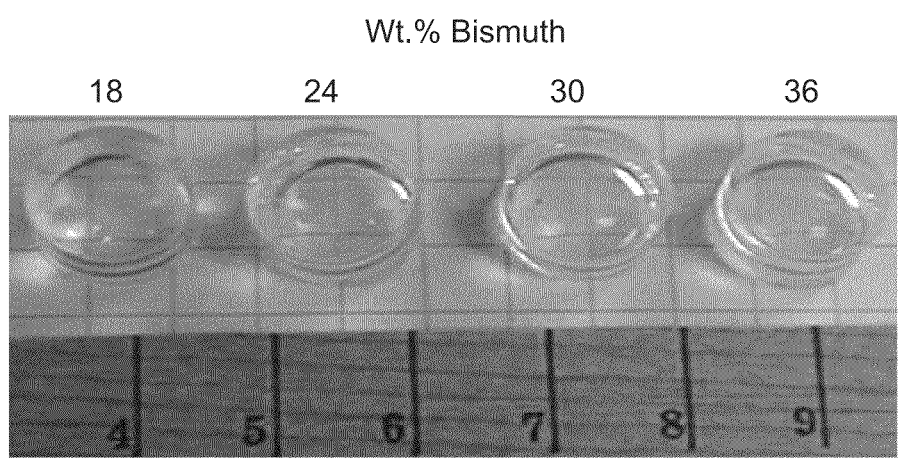
FIG. 6 shows various optically transparent Bi(P)-loaded PVT scintillators, each of which includes a different percentage of bismuth by weight of bismuth metal.

FIG. 6 illustrates four Bi(P)-loaded PVT scintillators, each of which includes a different percentage of bismuth by weight of bismuth metal. As shown in FIG. 6, each of the Bi(P)-loaded PVT scintillators is optically transparent.

Figure 8:
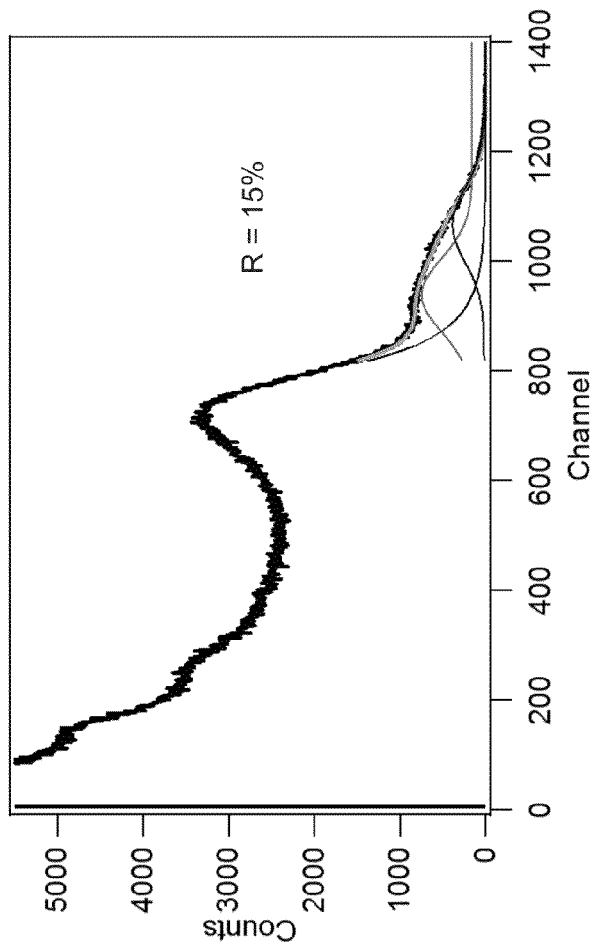
FIG. 8 shows the $^{137}$Cs pulse height spectrum obtained with a 2 inch$^3$, 9 wt. % Bi(P)-loaded PVT scintillator.
Figure 7A:
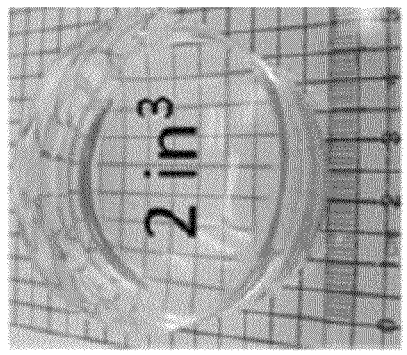
FIG. 7A shows an optically transparent Bi(P)-loaded PVT scintillator having 9 wt. % bismuth tripivalate based on the total weight of the plastic scintillator.
Figure 7B:
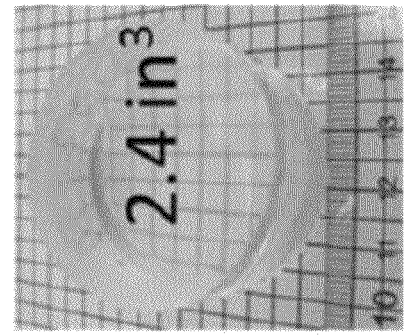
FIG. 7B shows an optically transparent Bi(P)-loaded PVT scintillator having 6 wt. % bismuth tripivalate based on the total weight of the plastic scintillator.

FIGS. 7A and 7B illustrate two Bi(P)-loaded PVT scintillators having 9 wt. % and 6 wt. % bismuth tripivalate based on the total weight of the plastic scintillator, respectively. Both of the Bi(P)-loaded PVT scintillators shown in 7A and 7B are optically transparent and offer energy resolution at 662 keV of 15% when irradiated with $^{137}$Cs source. For instance, FIG. 8 illustrates the $^{137}$Cs pulse height obtained with a 2 inch$^3$ 9 wt. % Bi(P)-loaded PVT scintillator.

Figure 9:
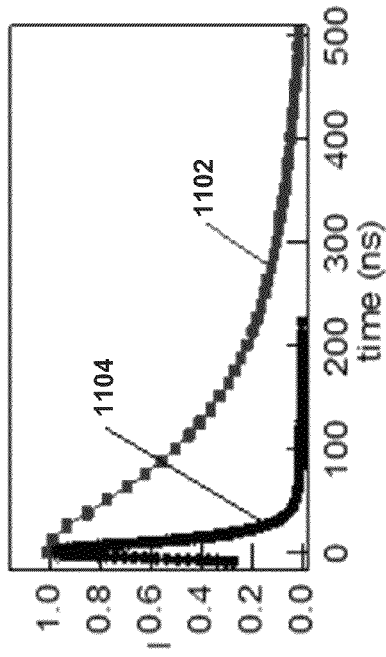
FIG. 9 shows an optically transparent 1 inch$^3$ Bi(P)-loaded PVT scintillator comprising a TPB fluor, and an Eljen-256 lead loaded PVT scintillator that is a 1 inch by 1 inch right cylinder.
Figure 10:
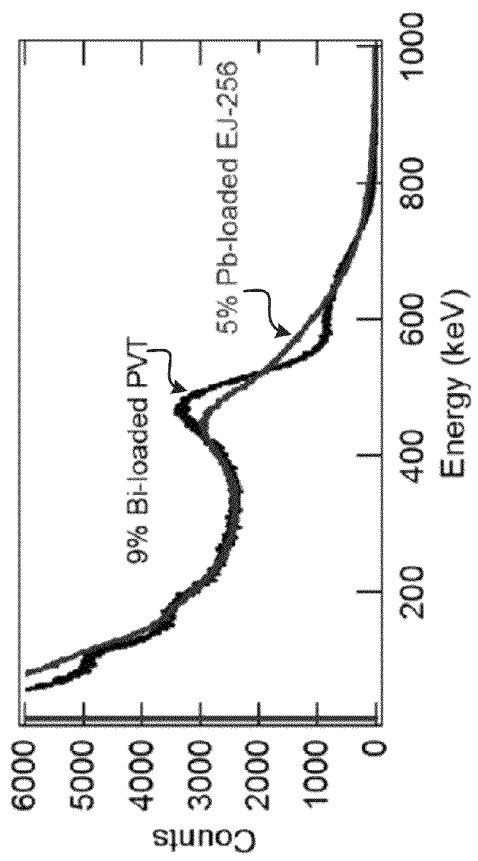
FIG. 10 shows the $^{137}$Cs pulse height spectra for the Bi(P)-loaded PVT scintillator and the Eljen-256 lead loaded PVT scintillator shown in FIG. 9.

FIG. 9 depicts a 1 inch³ Bi(P)-loaded PVT scintillator 902 comprising a TPB fluor and an Eljen-256 lead loaded PVT 1 inch by 1 inch right cylinder 904. The performance of these two optically transparent plastic scintillators is compared in FIG. 10. For instance, the $^{137}$Cs pulse height spectra shown in FIG. 10 illustrates that the 1 in³ Bi(P)-loaded PVT scintillator exhibits a clearer photopeak and better resolution as compared to the Eljen-256 plastic scintillator.

Figure 11:
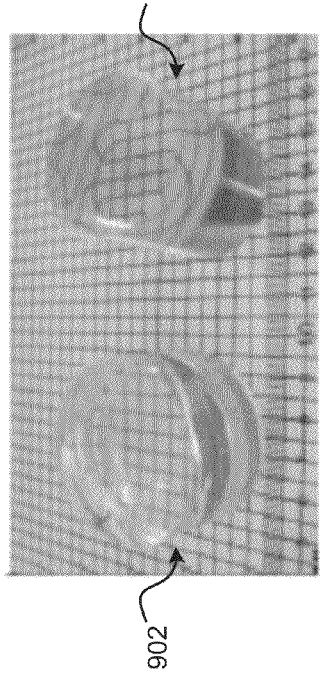
FIG. 11 shows a plot of average waveforms indicating different levels of delayed light in neutron and gamma scintillation pulses for a Bi(P)-loaded PVT scintillator with a tetraphenyl butadiene (TPB) fluor and a ZnS($^6$Li) phosphor coating on all sides of the scintillator except the side mounted to a photodetector.

FIG. 11 illustrates a plot of average waveforms indicating different levels of delayed light in neutron 1102 and gamma scintillation pulses 1104 for a Bi(P)-loaded PVT scintillator with a tetraphenyl butadiene (TPB) fluor and a ZnS($^6$Li) phosphor coating on all sides of the scintillator except the side mounted to a photodetector, according to one embodiment. As evident from FIG. 11, the decay time for neutron 1102 and gamma scintillation pulses 1104 is 200 ns and 2 ns, respectively. The large difference in pulse shape (100× difference in decay time) makes PSD distinction between gammas and neutrons straightforward and unambiguous.

Figure 12:
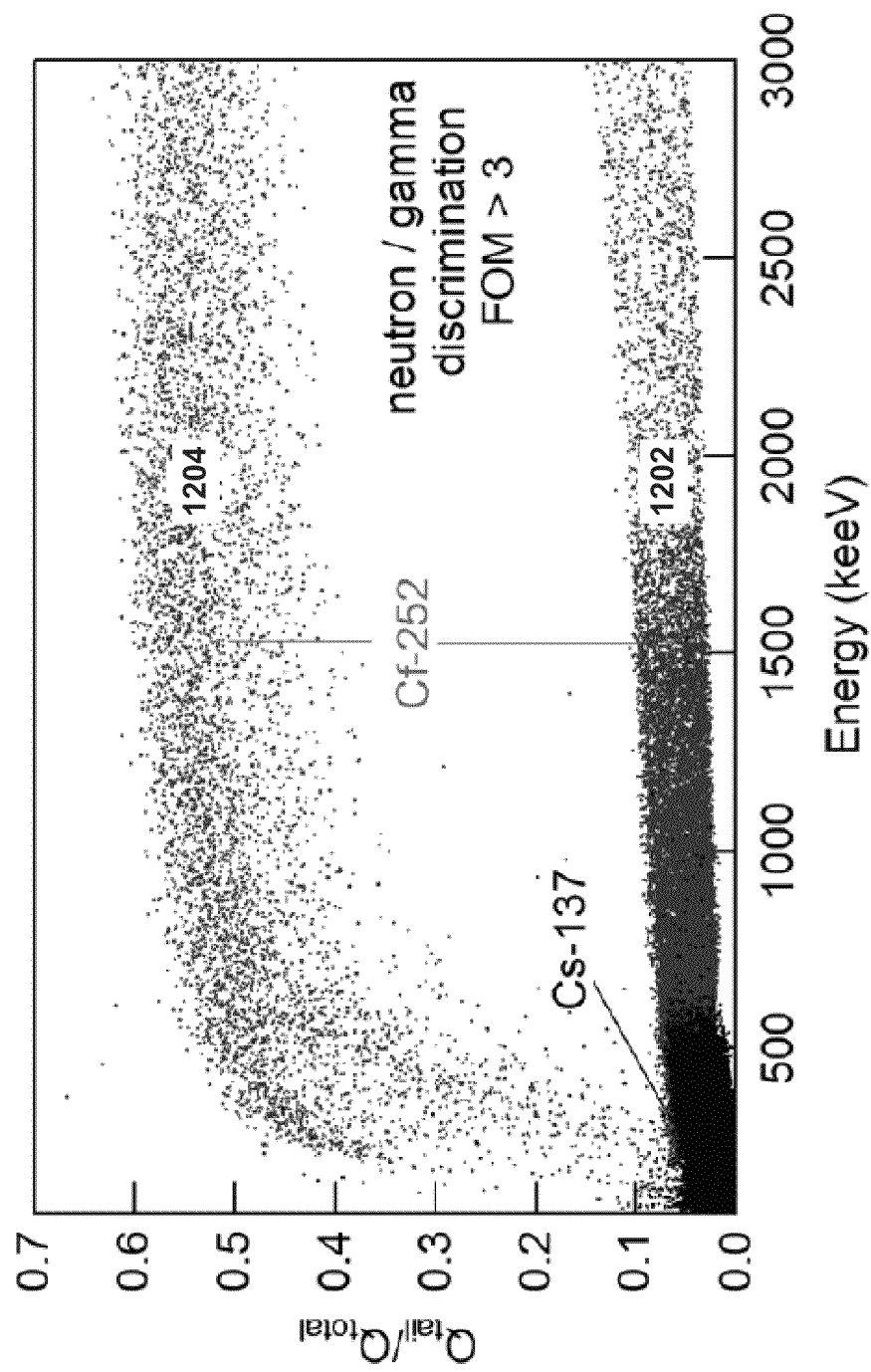
FIG. 12 shows PSD data acquired with a Bi(P)-loaded PVT scintillator with a 300 μm coating of $^6$Li paint on all sides of the scintillator except the side mounted to a photodetector, where the amount of the bismuth pivalate present is 9 wt. % based on the total weight of the plastic scintillator.

FIG. 12 illustrates PSD data acquired with a Bi(P)-loaded PVT scintillator with a 300 μm coating of $^6$Li paint on all sides of the scintillator except the side mounted to a photodetector, where the amount of the bismuth pivalate present is 9 wt. % based on the total weight of the plastic scintillator. The PSD data shown in FIG. 12 was acquired with a $^{252}$Cf source. The features shown in FIG. 12 include gamma events 1202 (centered around 0.05) and neutron events 1204 (centered around 0.5). Overlaid in dark black dots is the data acquired with the same scintillator but with a $^{137}$Cs source showing only gamma events.

Figure 13:
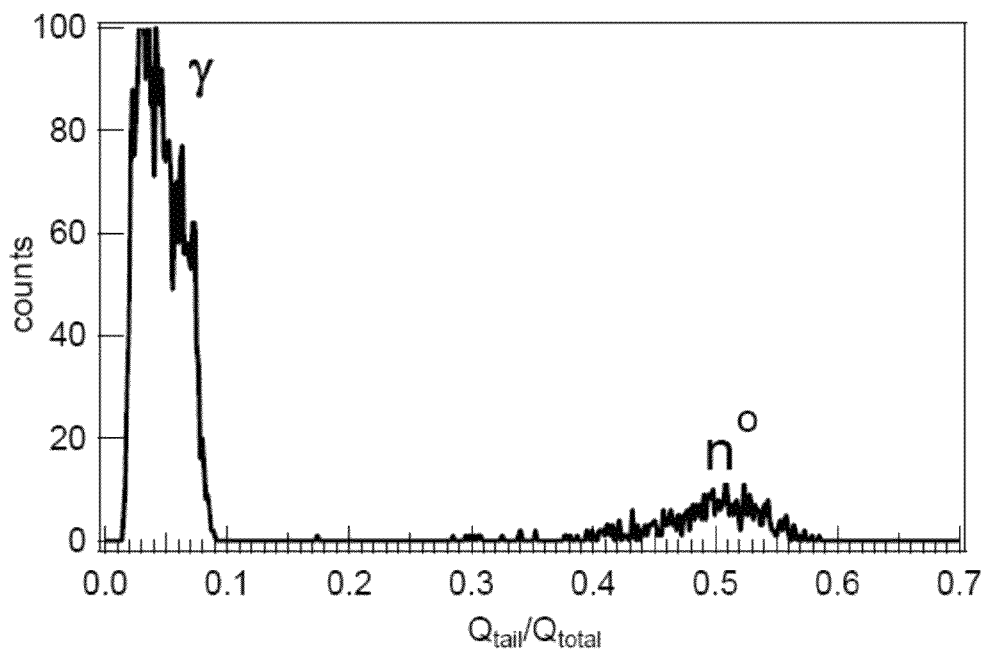
FIG. 13 shows a histogram of the PSD data shown in FIG. 12 for events between 600-800 keeV.

FIG. 13 provides a histogram of the PSD data shown in FIG. 12 for events between 600-800 keeV (where "eeV" is defined as "electron equivalent energy" since some of the events involve the $^6$Li reaction products). Quantitative evaluation of PSD was made by calculating the figure of merit (FOM) using the following equation: FOM=S/($\delta_1+\delta_2$), where S is the separation between the peaks corresponding to neutron and gamma radiation, and $\delta_1$ and $\delta_2$ are full width at half maxima (FWHM) of the corresponding peaks. The neutron/gamma figure of merit (FOM) corresponding to the histogram of FIG. 13 was thus calculated as follows: (0.5−0.030)/(0.05+0.08)=3.6.

Figure 14:
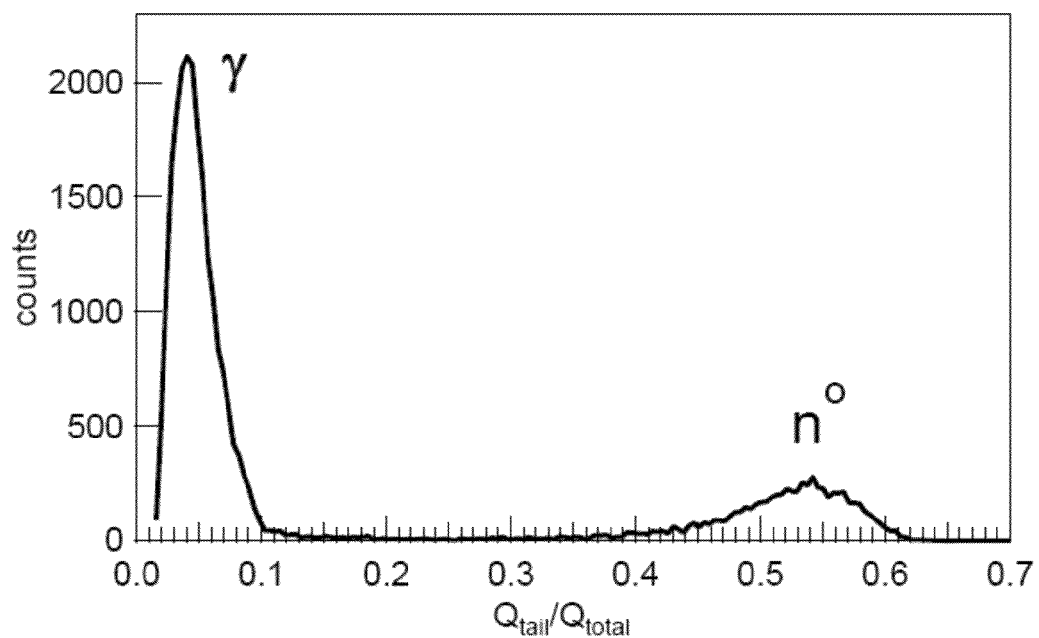
FIG. 14 shows a histogram of the PSD data shown in FIG. 12 for all events.

FIG. 14 provides a histogram of the PSD data shown in FIG. 12 for all events. The neutron/gamma FOM corresponding to the histogram of FIG. 14 was calculated as follows: (0.54−0.04)/(0.037+0.087)=4.03.

It has surprisingly and unexpectedly been found that PVT scintillators may include a high loading of bismuth tripivalate up to about 60 wt. % while still maintaining optical transparency. Table 1 lists the maximum loading of bismuth tripivalate and other bismuth containing compounds in a PVT matrix.

TABLE 1

| Bi compound | MW g/mol | Fraction Bi in compound | Max fractional loading (by compound) | Wt. % Bi in scintillator |
|---|---|---|---|---|
| Methacrylate (ref a) | 294 | 0.71 | 0.07 | 4 |
| Triphenyl (ref b) | 440 | 0.48 | 0.50 | 24 |
| Tripivalate (ref. c) | | 0.60 | 0.60 | 36 |

[a]G. H. V. Bertrand, F. Sguerra, C. Deh'e-Pittance, F. Carrel, R. Coulon, S. Normand, E. Barat, T. Dautremer, T. Montagu and M. Hamel "Influence of bismuth loading in polystyrene-based plastic scintillators for low energy gamma spectroscopy, J. Mater. Chem. C, 2, 7304-7312 (2014).
[b]B. L. Rupert, N. J. Cherepy, B. W. Sturm, R. D. Sanner, S. A. Payne, "Bismuth-loaded plastic scintillators for gamma-ray spectroscopy," Europhysics Lett., 97, 22002 (2012).
[c]This work It is important to note that up to about 60 wt. % of the novel bismuth tripivalate compound may also be incorporated into other polymer matrices disclosed herein (e.g., poly-styrene, poly-vinyltriphenylamine, poly(ethylene-2,6-naphthalene dicarboxylate), poly(ethylene terephthalate), polymethylmethacrylate, functionalized polymethacrylate, methacrylic acid, poly-9-vinylcarbazole, combinations thereof, etc.) and still result in an optically transparent plastic scintillator.

As noted previously, incorporation of a high Z component into a plastic scintillator may increase the scintillator's photoelectric absorption and sensitivity to gamma radiation. However, a reduction in light yield may be associated with increasing concentration of the high Z component due to the conversion of singlet excitons to triplet excitons via spin-orbit coupling to the high Z component.

Figure 15:
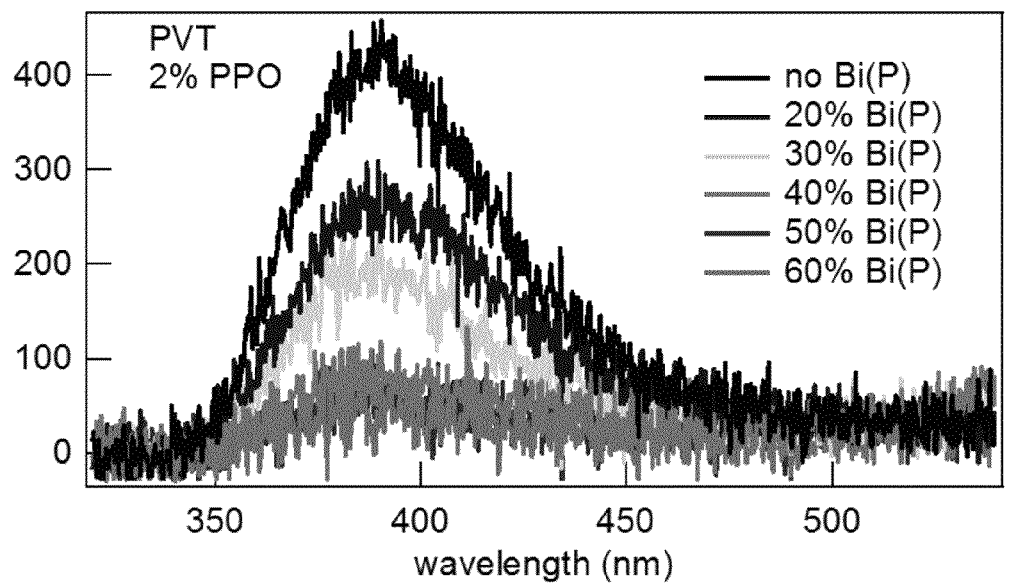
FIG. 15 shows light yield yield (LY) of a PVT/2 wt. % PPO scintillator with increasing concentrations of bismuth tripivalate.
Figure 16:
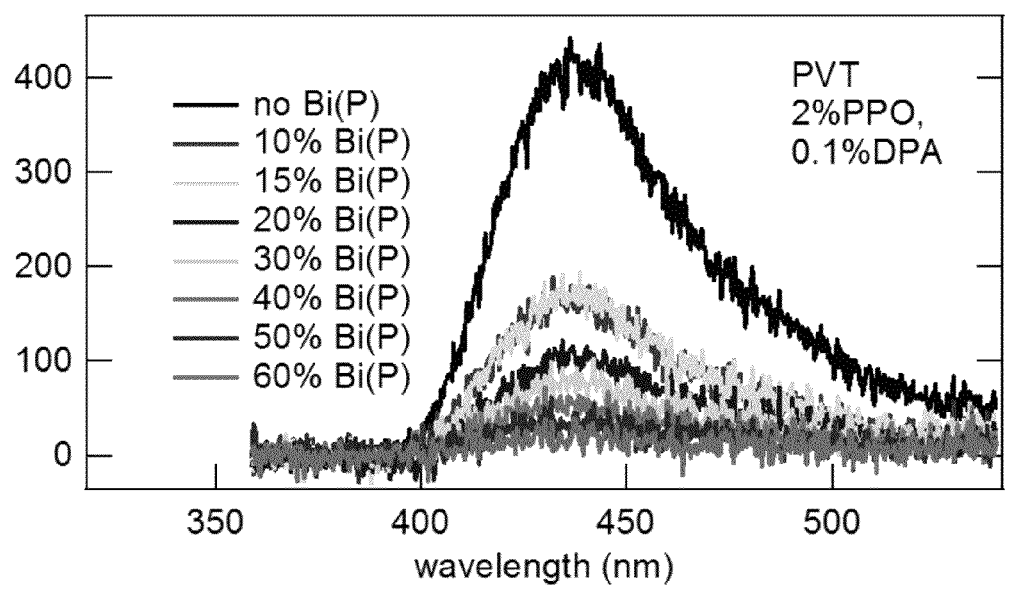
FIG. 16 shows the decreasing light yield of a PVT/2 wt. % PPO/0.1 wt. % DPA scintillator with increasing concentrations of bismuth tripivalate.

Accordingly, while PVT and the other polymer matrices disclosed herein are capable of supporting a high loading of bismuth tripivalate, the light yields of such plastic scintillators have also been found to decrease with increasing amounts of bismuth tripivalate. This is evident from FIG. 15, which depicts decreasing light yield of a PVT scintillator comprising 2 wt. % PPO with increasing concentrations of bismuth tripivalate. FIG. 16 additionally depicts the decreasing light yield of a PVT scintillator comprising 2 wt. % PPO and 0.1 wt. % DPA with increasing concentrations of bismuth tripivalate. In some approaches, an iridium complex or other such complex as would become apparent to a skilled artisan upon reading the present disclosure may be added to the Bi(P)-loaded PVT scintillators and other bismuth containing plastic scintillators described herein to increase the light yield even at high bismuth loading.

Lithium-loaded Plastic Scintillators

Unless otherwise specified, the following experiments results were conducted using plastic scintillators comprising a PVT polymer matrix with lithium pivalate ("Li(P)") homogeneously dispersed therein unless otherwise specified. For simplicity, these plastic scintillators will be referred to, in this section, as Li(P)-loaded PVT scintillators.

Figure 17:
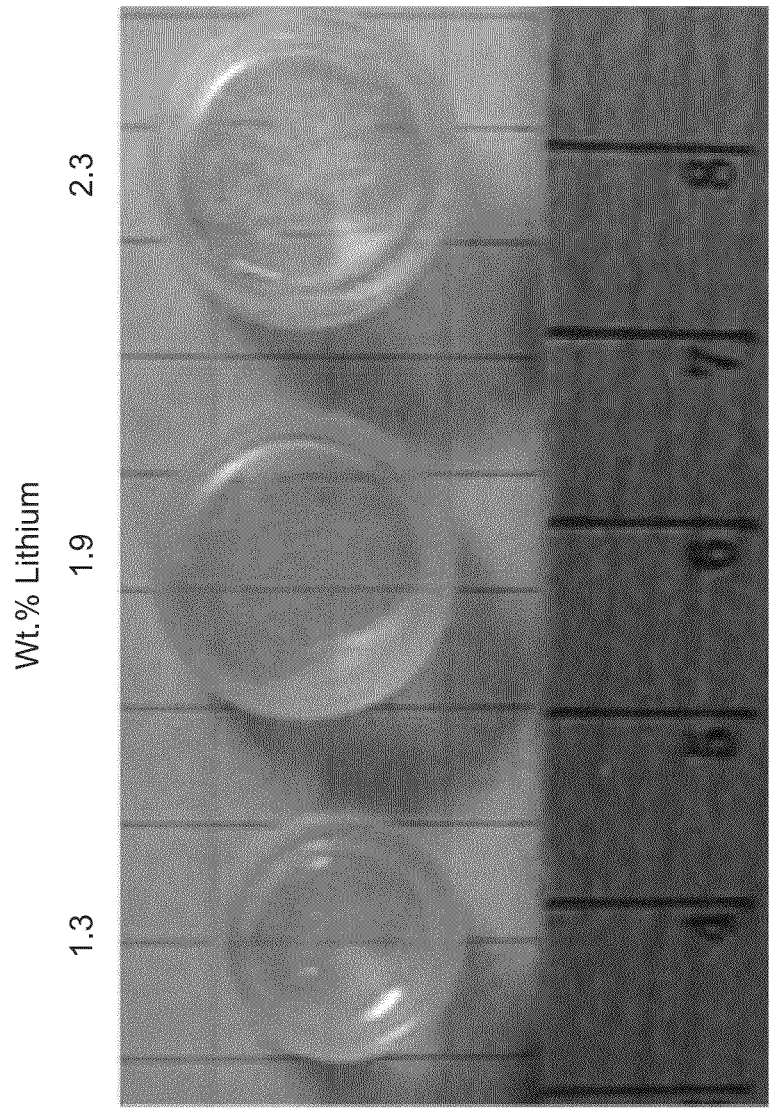
FIG. 17 shows three optically transparent Li(P)-loaded PVT scintillators, each of which includes a different percentage of lithium by weight of lithium metal.

FIG. 17 illustrates three Li(P)-loaded PVT scintillators, each of which includes a different percentage of lithium by weight of lithium metal. As shown in FIG. 17, each of the Li(P)-loaded PVT scintillators is optically transparent.

Figure 18:
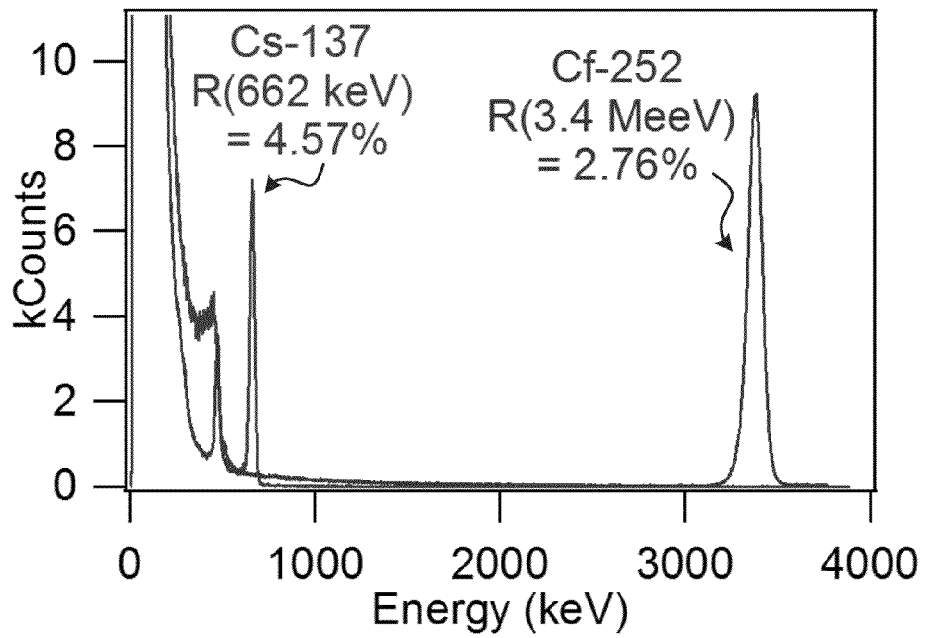
FIG. 18 shows the $^{137}$Cs and $^{252}$Cf pulse height spectra for a Cs$_2$LiYCl$_6$:Ce (CLYC) scintillator.
Figure 19:
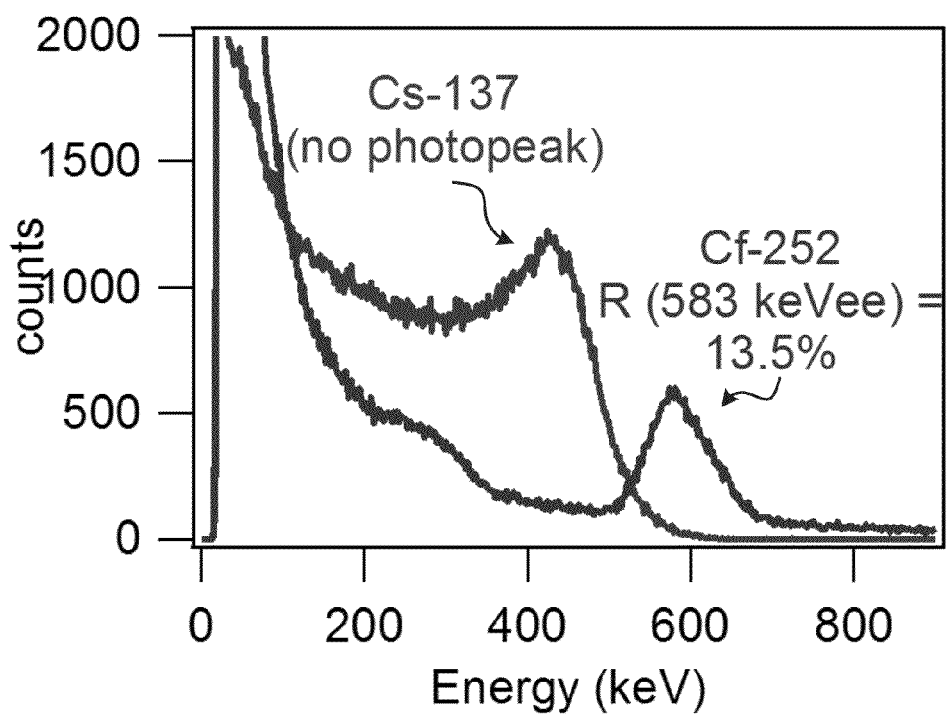
FIG. 19 shows the $^{137}$Cs and $^{252}$Cf pulse height spectra for a 1 inch$^3$ Li(P)-loaded PVT scintillator having 2 wt. % lithium pivalate based on a total weight of the plastic scintillator.

FIGS. 18 and 19 depict $^{137}$Cs and $^{252}$Cf pulse height spectra for a Cs$_2$LiYCl$_6$:Ce (CLYC) scintillator and a 1 inch³ Li(P)-loaded PVT scintillator having 1.3 wt. % lithium metal based on a total weight of the plastic scintillator, in the form of lithium pivalate, respectively. CLYC scintillators are known in the art to exhibit pulse height discrimination for efficient thermal neutron detection in the presence of a gamma radiation background. As shown in FIG. 18, the CLYC scintillator has an energy resolution at 662 keV of 4.57% when irradiated with the $^{137}$Cs gamma source. As additionally shown in FIG. 18, when the CLYC scintillator is irradiated with the $^{252}$Cf neutron source, a neutron capture event on the Li produces a peak occurring at the electron equivalent energy of 3.4 MeeV, where the energy resolution of CLYC at 3.4 MeeV is 2.76%. As terrestrial gamma rays do not exceed about 2.6 MeV, this peak at 3.4 MeeV serves as distinctive identifier or a neutron capture event. For lithium-loaded plastic scintillators, the light yield associated with neutron capture events is degraded as compared to the organic crystal CLYC scintillator due to quenching. Accordingly, as shown in FIG. 19, when the Li(P)-loaded PVT scintillator is irradiated with the $^{252}$Cf neutron source, the same neutron capture event seen in CLYC at the electron equivalent energy of 3.4 MeV actually occurs at the electron equivalent energy of 583 keeV and is thus not as well separated from the natural gamma background. Moreover, as also shown in FIG. 19, when the Li(P)-loaded PVT scintillator is irradiated with the $^{137}$Cs gamma source, no photopeak is detected. As evident from the comparison between FIGS. 18 and 19, the Li(P)-loaded PVT scintillator can efficiently stop thermal neutron but cannot match CLYC scintillators for effective pulse height discrimination. However, fabrication of Li(P)-loaded PVT scintillators is much simpler and inexpensive relative to the fabrication of CLYC scintillators.

Figure 20:
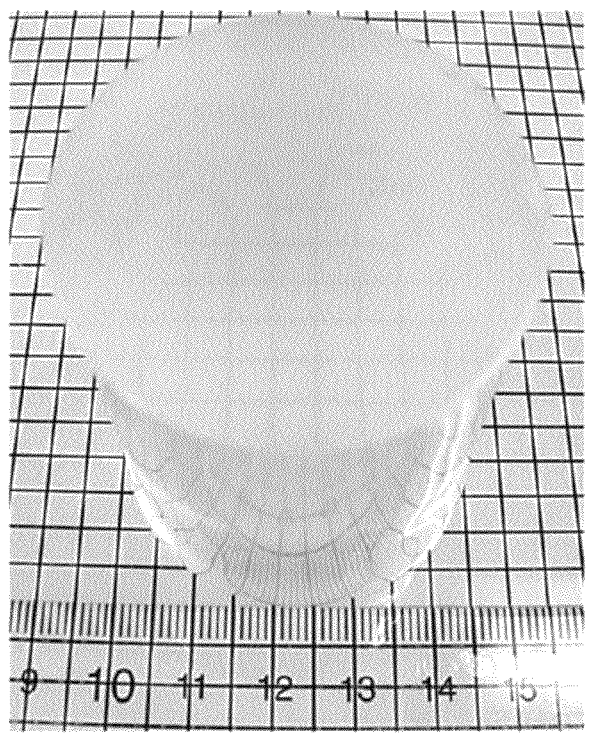
FIG. 20 shows a Li(P)-loaded PVT scintillator comprising 30 wt. % PPO, 0.1 wt. % DPA and 20 wt. % Li(P) 1.3 wt. % $^{nat}$Li, 0.097 et. % $^6$Li), where the Li(P)-loaded PVT scintillator has a diameter of 4.45 cm, a height of 5.6 cm, and a volume of 87 cm$^3$ (5.3 inches$^3$).

FIG. 20 illustrates a Li(P)-loaded PVT scintillator comprising 30 wt. % PPO, 0.1 wt. % DPA and 20 wt. % Li(P) 1.3 wt. % $^{nat}$Li, 0.097 et. % $^{6}$Li). This particular Li(P)-loaded PVT scintillator has a diameter of 4.45 cm, a height of 5.6 cm, and a volume of 87 cm$^3$ (5.3 inches$^3$). It is important to note that the Li(P)-loaded PVT scintillator of FIG. 20 is a little larger than required to fully stop thermal neutrons, and as further shown by comparison of FIGS. 21A-21B, 22A-22B and 23A-23B described below, it is likely that some high energy neutrons will thermalize within the volume of the Li(P)-loaded PVT scintillator.

Figure 21A:
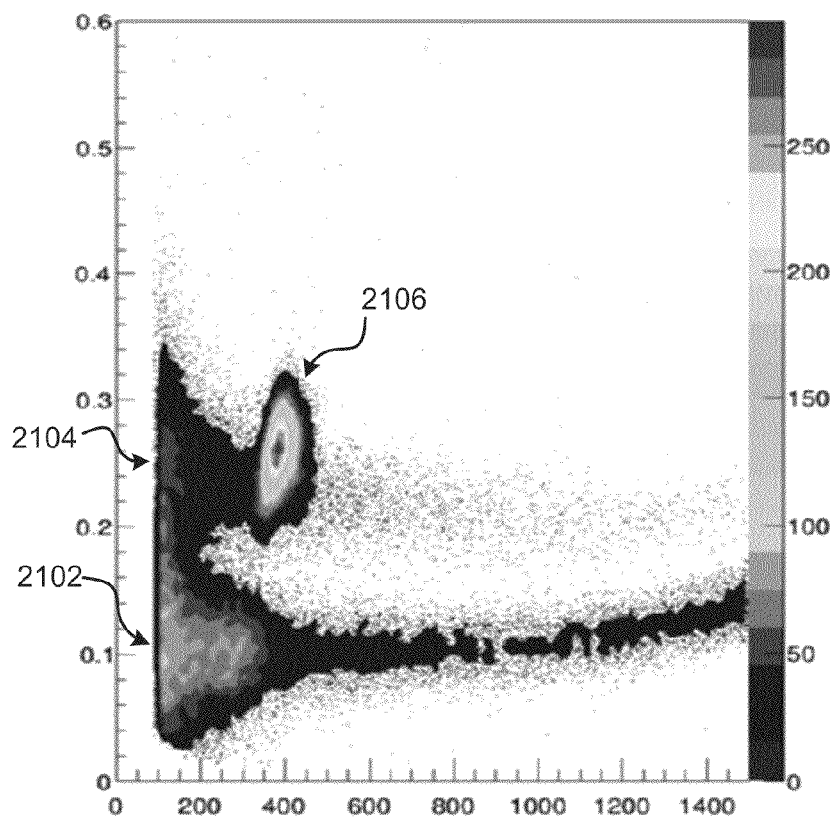
FIG. 21A shows $^{252}$Cf PSD data acquired with the Li(P)-loaded PVT scintillator of FIG. 20.
Figure 21B:
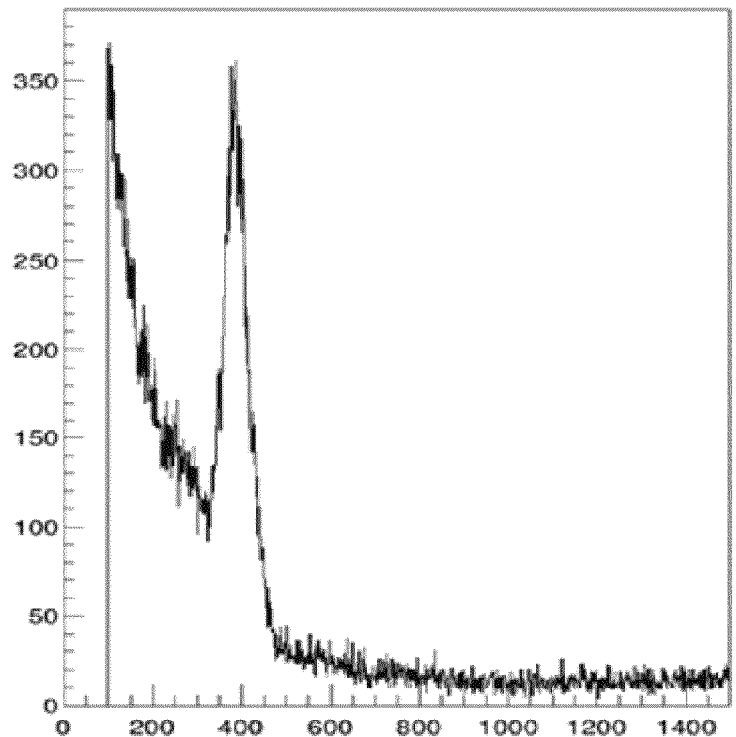
FIG. 21B shows a histogram of the $^{252}$Cf PSD data depicted in FIG. 22A.

FIGS. 21A-21B depict $^{252}$Cf PSD data and a histogram of said data, respectively, acquired with the Li(P)-loaded PVT scintillator of FIG. 20. The features shown in FIG. 21A include gamma events 2102 (centered around 0.1), high energy neutron events 2104 (centered around 0.23) and thermal neutron capture events 2106 (circle of events at about 400 keeV, with the ratio of charge $Q_{Tail}/Q_{Total}$ centered at 0.27. As shown in FIG. 21B, the histogram of the PSD data reveals a sharp peak for neutron capture at about 400 keeV, with energy resolution of 12.5% FWHM.

Figure 22A:
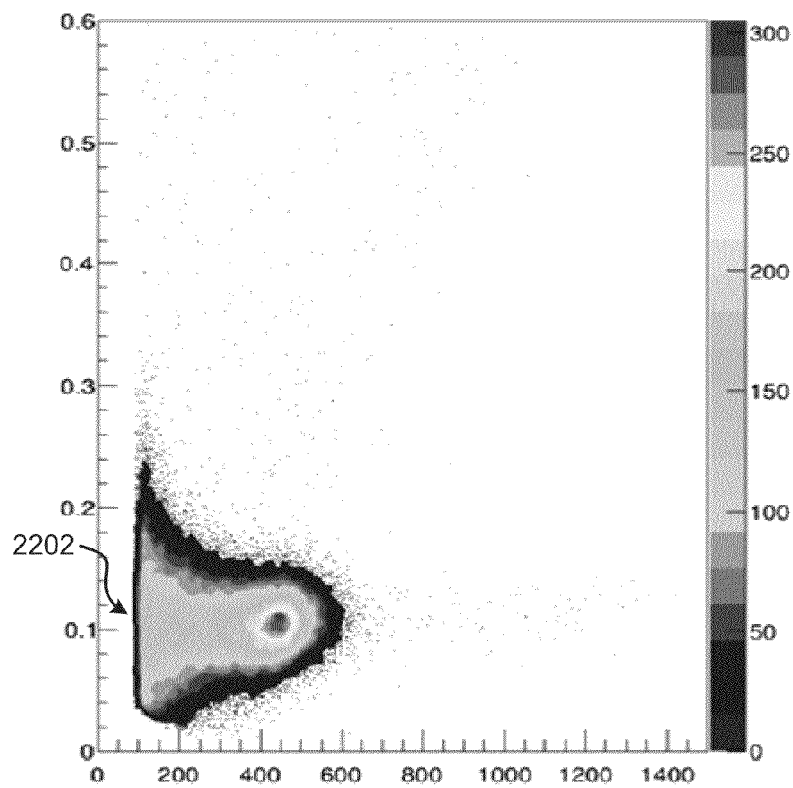
FIG. 22A depict $^{137}$Cs PSD data acquired with the Li(P)-loaded PVT scintillator of FIG. 20.
Figure 22B:
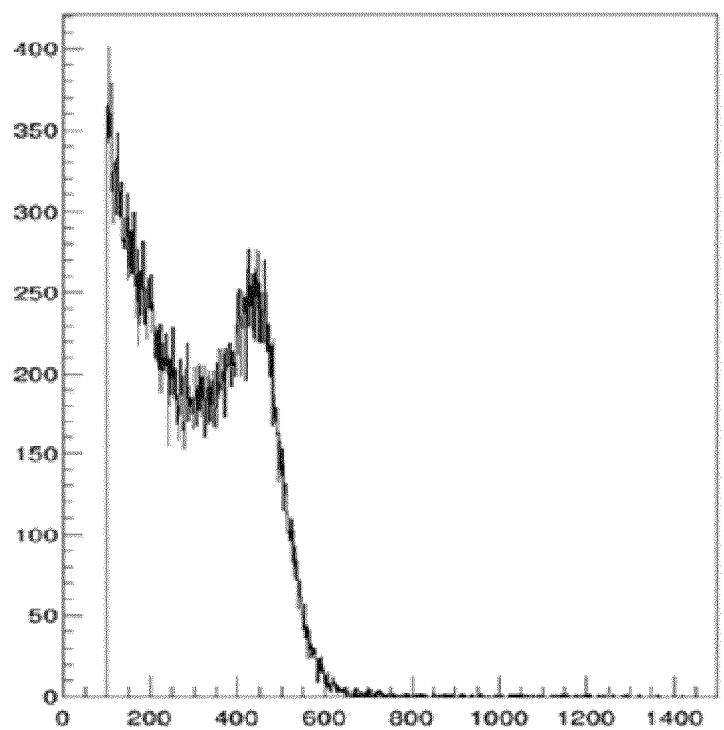
FIG. 22B shows a histogram of the $^{137}$Cs PSD data depicted in FIG. 23A.
Figure 24:
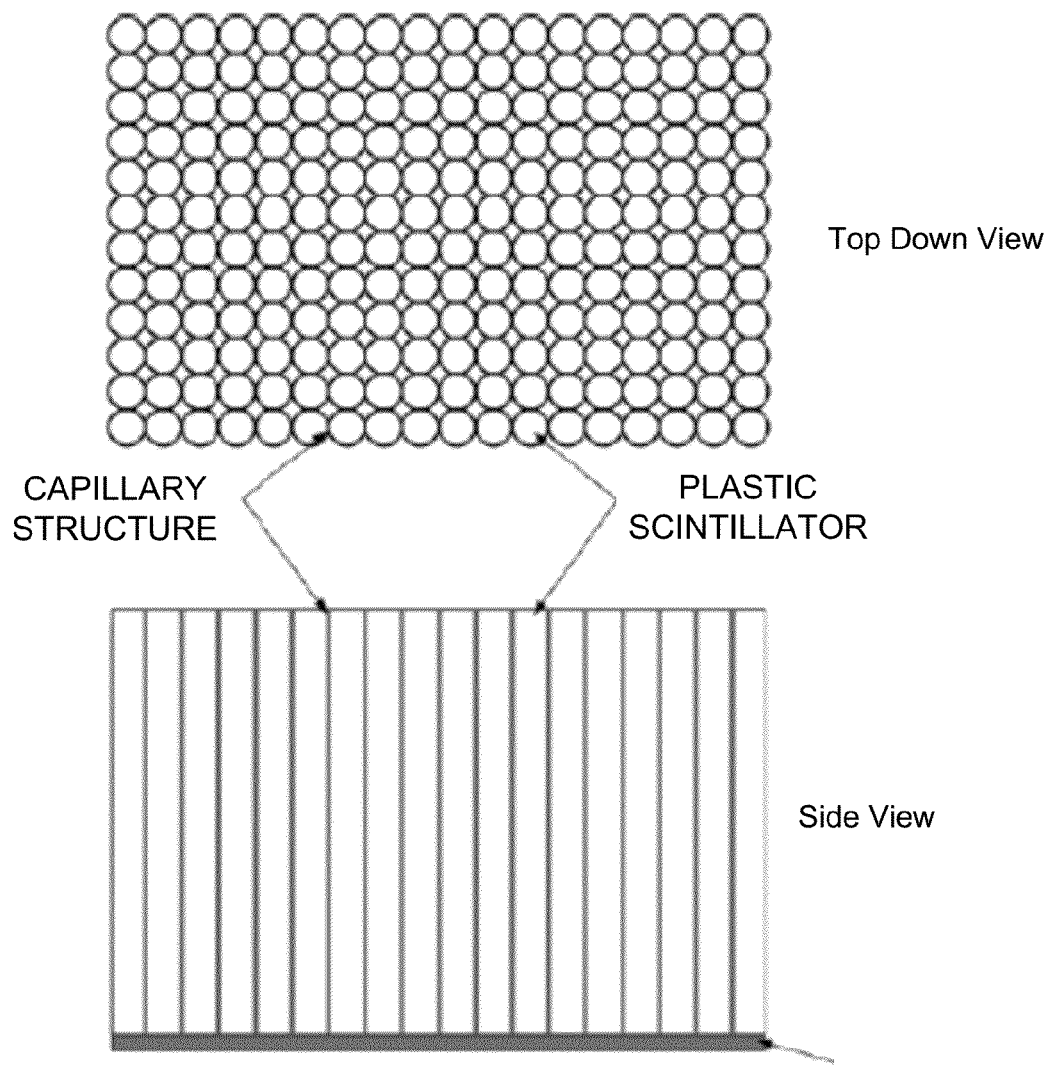
FIG. 24 shows a simplified representation of a capillary array which may be used in neutron radiography applications.

FIGS. 22A-22B depict $^{137}$Cs PSD data and a histogram of said data, respectively, acquired with the Li(P)-loaded PVT scintillator of FIG. 20. The features shown in FIG. 22A include gamma events 2202 (centered around 0.1). As shown in FIG. 22B, the histogram of the PSD data reveals the Compton edge for the 662 keV gamma from $^{137}$Cs.

FIGS. 23A-23B depict $^{252}$Cf and $^{137}$Cs PSD data, respectively, for standard PSD plastic scintillators such as those currently sold by Eljen Technology. A comparison between FIGS. 22A-22B and 23A-23B reveals that for the standard PSD plastic scintillators, the PSD performance related to distinguishing gammas from high energy neutron is comparable to that of the Li(P)-loaded PVT scintillator but without the additional, well-resolved neutron capture peak of the plastic scintillator at 0.097 wt. % $^{6}$Li.

It has surprisingly and unexpectedly been found that PVT scintillators may include a high loading of lithium pivalate up to about 30 wt. % while still maintaining optical transparency. Table 2 lists the maximum loading of lithium tripivalate and other lithium containing compounds in a PVT matrix also loaded with high fluor concentration for references b and c to enable pulse shape discrimination.

TABLE 2

| Li compound | MW g/mol | Fraction Li in compound | Max fractional loading (by compound) | Fraction Li in scintillator | Fraction $^{6}$Li in scintillator, $^{Nat}$Li | Wt. % $^{6}$Li in scintillator, $^{Nat}$Li | Wt. % $^{6}$Li in scintillator pure $^{6}$Li |
|---|---|---|---|---|---|---|---|
| Methacrylate (ref. a) | 92 | 0.0761 | 0.1000 | 0.0076 | 0.0006 | 0.0571 | 0.7609 |
| Phenylsalicylate (ref. b) | 220 | 0.0318 | 0.0750 | 0.0024 | 0.0002 | 0.0179 | 0.2386 |
| Pivalate (ref. c) | 108 | 0.0648 | 0.2000 | 0.0130 | 0.0010 | 0.0972 | 1.2963 |
| CLYC (ref. d) | 574 | 0.0122 | 1.0000 | 0.0122 | 0.0009 | 0.0915 | 1.2195 | a. R. D. Breukers, C. M. Bartle, A. Edgar, "Transparent lithium loaded plastic scintillators for thermal neutron detection," Nuclear Instruments and Methods A, 701, 58-61 (2013).
b. Zaitseva, et al, "Pulse shape discrimination with lithium-containing organic scintillators," Nuclear Instruments and Methods A, 729, 747-754 (2013).
c. This work
d. J. Glodo, R. Hawrami, K. S. Shah, "Development of the Cs$_2$LiYCl$_6$ Scintillator," J. Crystal Growth, 379, 73-78 (2013).

It is important to note that up to about 30 wt. % of the novel lithium pivalate compound may also be incorporated into other polymer matrices disclosed herein (e.g., poly-styrene, poly-vinyltriphenylamine, poly(ethylene-2,6-naphthalene dicarboxylate), poly(ethylene terephthalate), polymethylmethacrylate, functionalized polymethacrylate, methacrylic acid, poly-9-vinylcarbazole, combinations thereof, etc.) and still result in an optically transparent plastic scintillator.

Table 3 illustrates neutron capture and detection efficiency for three different neutron scintillators, normalized to a common stopping efficiency, $\epsilon$, of 0.67.

TABLE 3

| Scintillator | $^{6}$Li σ (barns) | LY, neutron (Photons) | $^{6}$Li loading fraction | Thickness (cm) | $\epsilon =$ $1 - \exp(-N\sigma)$ | DetEff = $\epsilon *$ LY | Relative DetEff | PSD FOM |
|---|---|---|---|---|---|---|---|---|
| ZnS(Ag)/$^{6}$LiF | 940 | 160,000 | 0.2 | 0.036 | 0.67 | 105,000 | 18 | 4 |
| $^{nat}$Li-Plastic, based on $^{nat}$Li(P) | 940 | 9,000 | 0.001 | 1.95 | 0.67 | 6000 | 1 | ~2 |
| $^{6}$Li-Plastic, based on $^{6}$Li(P) | 940 | 9,000 | 0.013 | 0.15 | 0.67 | 6000 | 1 | ~2 |

The first scintillator listed in Table 3 comprises a 360 um thick ZnS(Ag)/$^{6}$Li paint layer on the surface of a Bi-loaded plastic, such as those disclosed herein, or other known transparent, non-optically absorptive plastic. The other two scintillators in Table 3 are $^{6}$Li based plastics comprising either natural Li or $^{6}$Li, respectively, at 20 wt. % lithium pivalate loading. For equivalent neutron stopping efficiency of 67%, a 360 um layer of ZnS(Ag)/⁶Li paint is needed, or 1.95 cm of Li-plastic, based on natural Lithium, or 1.5 mm of ⁶Li-plastic. One particular advantage of the ZnS(Ag)/⁶Li paint is its very high light yield and better PSD, compared to the Li-loaded plastics. The high light yield and better PSD associated with the ZnS(Ag)/⁶Li paint allows for the production of a scintillation detector based on the Bi-loaded plastic that efficiently detects neutrons (which thermalize in the plastic), with an excellent PSD figure-of-merit of about 4. Moreover, the ⁶Li-plastics may be made very thin, e.g., less than about 2 mm, such that very few gamma events will deposit more than 400 keeV when they Compton scatter in the material. Accordingly, for the ⁶Li-plastics with a thickness of less than about 2 mm, both pulse height and pulse shape discrimination may be combined for effective neutron detection in the presence of gammas.

Applications and Uses

Embodiments of the present invention may be used in a wide variety of applications, and potentially any application in which high light yield and/or pulse shape discrimination between gammas, fast and thermal neutrons, charged particles, etc. is useful.

Illustrative uses of various embodiments of the present invention include, but are not limited to, applications requiring radiation detection. Detection, surveillance and monitoring of radioactive materials, including identification of special nuclear materials (SNM), are a few such examples. Various embodiments can also be used in the nuclear fuel cycle, homeland security applications, nuclear non-proliferation, medical imaging, special nuclear material, high energy physics facilities, etc. Moreover, the figure of merit (FOM) performance metric is already sufficient to distinguish neutrons from gammas down to the few hundred keV/gamma equivalent regime, and will be very useful for non-proliferation, homeland security and safeguards applications.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

Further applications may includes radiography, dosimetry, and scientific research.

For example, in one embodiment, a plastic scintillator comprising lithium pivalate homogenously dispersed in a polymer matrix may be used for neutron radiography screens. Currently, very thin screens including ZnS(Ag)/⁶Li phosphors are used for neutron radiography applications. While screens with ZnS(Ag)/⁶Li have a high light yield (LY) of 160,000 photons per a neutron capture event on ⁶Li, such screens are limited to thicknesses of 300 microns or less, as ZnS(Ag)/⁶Li is opaque at thicknesses exceeding 300 microns. Conversely, plastic scintillators comprising up to 30 wt. % lithium pivalate are optically transparent and are not limited to a particular thickness, in this case higher loading with Li can be achieved since these formulations do not require high fluor concentrations, as for the PSD plastics. Accordingly, in particular approaches, these lithium pivalate loaded plastic scintillators may be deposited in capillary arrays (see FIG. 25), which provide optical channeling such that light pulses generated from a neutron capture event at the top of the capillary array may be channeled down to a CCD camera, amorphous Silicon array or other suitable imaging device present at the bottom of the capillary array.

In some approaches, the plastic scintillator sheets may include a Li-loaded plastic with a conventional fluor dispersed therein. In other approaches, the plastic scintillator sheets may include a spin-orbit coupling fluor, such as an iridium complex.

In one embodiment, plastic scintillation sheets may be used in a lens-coupled with a neutron source providing neutrons in the range of 60 keV-14 MeV.

Any of the methods, systems, devices, etc. described above, taken individually or in combination, in whole or in part, may be included in or used to make one or more systems, structures, etc. In addition, any of the features presented herein may be combined in any combination to create various embodiments, any of which fall within the scope of the present invention.

For example, according to one embodiment an optically transparent material may include at least one metal compound incorporated into a polymeric matrix. In some approaches, the at least one metal compound may include one or more carboxylate ligands, where at least one of the one or more carboxylate ligands preferably has a tertiary butyl group. In various approaches, tertiary butyl group may be present in an amount greater than about 5 wt. % based on a total weight of the metal compound.

In preferred approaches, at least one of the carboxylate ligands is pivalate, the pivalate being present in an amount greater than about 5 wt. % based on a total weight of the metal-pivalate compound.

In more approaches, the polymer matrix of the optically transparent material may include at least one of: poly-styrene, poly-vinyltoluene, poly-vinyltriphenylamine, poly(ethylene-2,6-naphthalene dicarboxylate), poly(ethylene terephthalate), polymethylmethacrylate, functionalized polymethacrylate, methacrylic acid and poly-9-vinylcarbazole.

In yet more approaches, the at least one metal compound of the optically transparent material may be functionalized with a polymerizable group, such as a vinyl group. As such, the at least one metal compound may be structurally characterized as being copolymerized with the polymer matrix in particular approaches.

According to another embodiment, a scintillator may include: at least one metal compound incorporated into a polymeric matrix, the at least one metal compound including one or more carboxylate ligands, where at least one of the one or more carboxylate ligands preferably has a tertiary butyl group. In one approach, the tertiary butyl group may be present in an amount greater than about 5 wt. % based on a total weight of the metal compound.

In various approaches, the scintillator may be optically transparent and may exhibit an optical response signature for at least one of: thermal neutrons, fast neutrons and gamma rays.

In some approaches, the at least one metal compound in the scintillator may include bismuth. In one particular approach, the at least one metal compound may be bismuth tripivalate.

In other approaches, the at least one metal compound in the scintillator may include lithium. In one particular approach, the at least one metal compound may be lithium pivalate.

In more approaches, the scintillator may further comprise an effective amount of one or more fluors having an emission rating of greater than about 3,000 photons/MeV. Each of the one or more fluors may be independently selected from a group consisting of: an organometallic fluor, and an organic fluor, in numerous approaches.

In yet more approaches, an energy resolution of the scintillator at 662 keV may be between about 20% and 3%.

In further approaches, at least one surface of the scintillator may be coated with a coating configured to exhibit an optical response signature for thermal neutrons, wherein the coating comprises a ZnS phosphor combined with at least one of $^6$Li, $^{10}$B, Cd and Gd.

In additional approaches, the scintillator may be a component of a scintillator radiation detector system that includes a processing device configured to process pulse traces corresponding to light pulses from the scintillator. In various approaches, this processing device may be further configured to generate radiological image data based on the pulse traces.

According to yet another embodiment, a method may include: processing pulse traces corresponding to light pulses from a scintillator material; and outputting a result of the processing, where the scintillator material comprises at least one metal compound incorporated into a polymeric matrix, the at least one metal compound including one or more carboxylate ligands, where at least one of the one or more carboxylate ligands has a tertiary butyl group. In one approach, the at least one metal compound includes bismuth. In another approach, the at least one metal compound includes lithium, the scintillator material thus exhibiting an optical response signature for neutrons that is different than an optical response signature for gamma rays.

In additional approaches, the scintillator material described in the aforementioned method may be optically transparent and has an energy resolution at 662 keV of less than about 20%.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A material, comprising:
   at least one metal compound incorporated into a polymeric matrix,
   wherein the metal compound includes a metal and one or more carboxylate ligands,
   wherein at least one of the one or more carboxylate ligands includes a tertiary butyl group,
   wherein the material is optically transparent.

2. The material as recited in claim 1, wherein the metal compound is present in an amount greater than about 5 wt. %.

3. The material as recited in claim 1, wherein the carboxylate ligand including the tertiary butyl group is pivalate, wherein the metal pivalate compound is present in an amount greater than about 5 wt. %.

4. The material as recited in claim 1, wherein the polymer matrix includes at least one of: poly-styrene, poly-vinyltoluene, poly-vinyltriphenylamine, poly(ethylene-2,6-naphthalene dicarboxylate), poly(ethylene terephthalate), polymethylmethacrylate, functionalized polymethacrylate, methacrylic acid and poly-9-vinylcarbazole.

5. The material as recited in claim 1, wherein the metal compound is functionalized with a polymerizable group.

6. The material as recited in claim 5, wherein the metal compound is structurally characterized as being copolymerized with the polymer matrix.

7. A scintillator, comprising:
   the material as recited in claim 1,
   wherein the scintillator exhibits an optical response signature for at least one of: thermal neutrons, fast neutrons and gamma rays.

8. The scintillator as recited in claim 7, wherein the metal comprises bismuth.

9. The scintillator as recited in claim 8, wherein the carboxylate ligands including the tertiary butyl group is pivalate.

10. The scintillator as recited in claim 7, wherein the metal comprises lithium.

11. The material as recited in claim 10, wherein the carboxylate ligand including the tertiary butyl group is pivalate.

12. The scintillator as recited in claim 7, further comprising an effective amount of one or more fluors having an emission rating of greater than about 3,000 photons/MeV.

13. The scintillator as recited in claim 12, wherein each of the one or more fluors is independently selected from a group consisting of: an organometallic fluor, and an organic fluor.

14. The scintillator as recited in claim 7, wherein an energy resolution of the scintillator at 662 keV is between about 20% and 3%.

15. The scintillator as recited in claim 7, wherein at least one surface of the scintillator is coated with a coating configured to exhibit an optical response signature for thermal neutrons, wherein the coating comprises a phosphor combined with at least one of $^6$Li, $^{10}$B, Cd and Gd.

16. A scintillator radiation detector system, comprising:
   the scintillator as recited in claim 7; and
   a processing device configured to process pulse traces corresponding to light pulses from the scintillator.

17. The scintillator radiator detector system as recited in claim 16, wherein the processing device is further configured to generate radiological image data based on the pulses.

18. A method, comprising:
   processing pulse traces corresponding to light pulses from a scintillator material; and
   outputting a result of the processing,
   wherein the scintillator material comprises at least one metal compound incorporated into a polymeric matrix, the at least one metal compound including a metal and one or more carboxylate ligands,
   wherein at least one of the one or more carboxylate ligands has a tertiary butyl group,
   wherein the scintillator material is optically transparent and has an energy resolution at 662 keV of less than about 20%.

19. The method as recited in claim 18, wherein the metal comprises bismuth.

20. The method as recited in claim 18, wherein the metal comprises lithium, and wherein the scintillator material exhibits an optical response signature for neutrons that is different than an optical response signature for gamma rays.

* * * * *